(12) United States Patent
Tan

(10) Patent No.: US 7,946,594 B2
(45) Date of Patent: May 24, 2011

(54) DRILL CHUCK LOCKED THROUGH AN INCLINED WEDGE SURFACE

(75) Inventor: Xingda Tan, Wendeng (CN)

(73) Assignee: Shandong Weida Machinery Co., Ltd., Wendeng, Shandong Providence (CN)

( * ) Notice: Subject to any disclaimer, the term of this patent is extended or adjusted under 35 U.S.C. 154(b) by 872 days.

(21) Appl. No.: 11/751,992

(22) Filed: May 22, 2007

(65) Prior Publication Data
US 2008/0136124 A1 Jun. 12, 2008

(30) Foreign Application Priority Data

May 23, 2006 (CN) .......................... 2006 1 0080642
Nov. 21, 2006 (CN) ....................... 2006 2 0160510 U

(51) Int. Cl.
B23B 31/16 (2006.01)
(52) U.S. Cl. ........................ 279/62; 279/140; 279/902
(58) Field of Classification Search .............. 279/60–65, 279/140, 902; B23B 31/16
See application file for complete search history.

(56) References Cited

U.S. PATENT DOCUMENTS

| | | | | |
|---|---|---|---|---|
| 3,970,323 | A * | 7/1976 | Schnizler, Jr. .................. | 279/64 |
| 4,302,021 | A * | 11/1981 | Rohm ............................ | 279/60 |
| 4,456,271 | A * | 6/1984 | Kern et al. ...................... | 279/91 |
| 5,031,925 | A | 7/1991 | Tatsu et al. | |
| 5,232,230 | A * | 8/1993 | Lin ................................ | 279/62 |
| 5,407,215 | A * | 4/1995 | Yang .............................. | 279/64 |
| 5,499,830 | A * | 3/1996 | Schnizler ....................... | 279/62 |
| 5,741,016 | A * | 4/1998 | Barton et al. ................... | 279/62 |
| 7,503,565 | B2 * | 3/2009 | Rohm ............................ | 279/60 |
| 7,637,510 | B2 * | 12/2009 | Tan ................................ | 279/62 |
| 7,726,663 | B2 * | 6/2010 | Mack et al. .................... | 279/60 |
| 7,726,917 | B2 * | 6/2010 | Mack ............................ | 408/124 |
| 2007/0235951 | A1 * | 10/2007 | Mack ............................ | 279/60 |
| 2007/0241519 | A1 * | 10/2007 | Zhou et al. .................... | 279/62 |
| 2008/0217869 | A1 * | 9/2008 | Mack ............................ | 279/62 |
| 2009/0058019 | A1 * | 3/2009 | Mack .......................... | 279/114 |
| 2010/0207336 | A1 * | 8/2010 | Mack ............................ | 279/60 |

FOREIGN PATENT DOCUMENTS

| | | |
|---|---|---|
| CN | 2059607 U | 7/1990 |
| CN | 1053206 | 7/1991 |
| CN | 2480087 Y | 3/2002 |
| CN | 2671723 Y | 1/2005 |
| CN | 1575921 | 2/2005 |
| DE | 3713457 C1 * | 9/1988 |
| JP | 02172605 A * | 7/1990 |
| JP | 03049808 A * | 3/1991 |
| WO | WO 02/100583 A1 | 12/2002 |

* cited by examiner

*Primary Examiner* — Eric A Gates
(74) *Attorney, Agent, or Firm* — Hoffmann & Baron, LLP

(57) ABSTRACT

A drill chuck locked through an inclined wedge surface, comprising a drill body, plural jaws, a nut, an outer sleeve, a control sleeve, a poking claw and a wedge block type lock ring. The wedge block type lock ring is rotatably fitted around the drill body to drive the nut to rotate, with a wedge lock and an elastic member biasing the wedge block pivotally connected therein, wherein the wedge block has an inclined wedge surface to be locked frictionally with the locking surface of the drill body; the control sleeve is connected with the outer sleeve to drive the wedge block type lock ring to rotate; the poking claw rotates simultaneously with the control sleeve between a first position where the poking claw is out of contact with the wedge block and a second position where the poking claw contacts the wedge block.

7 Claims, 21 Drawing Sheets

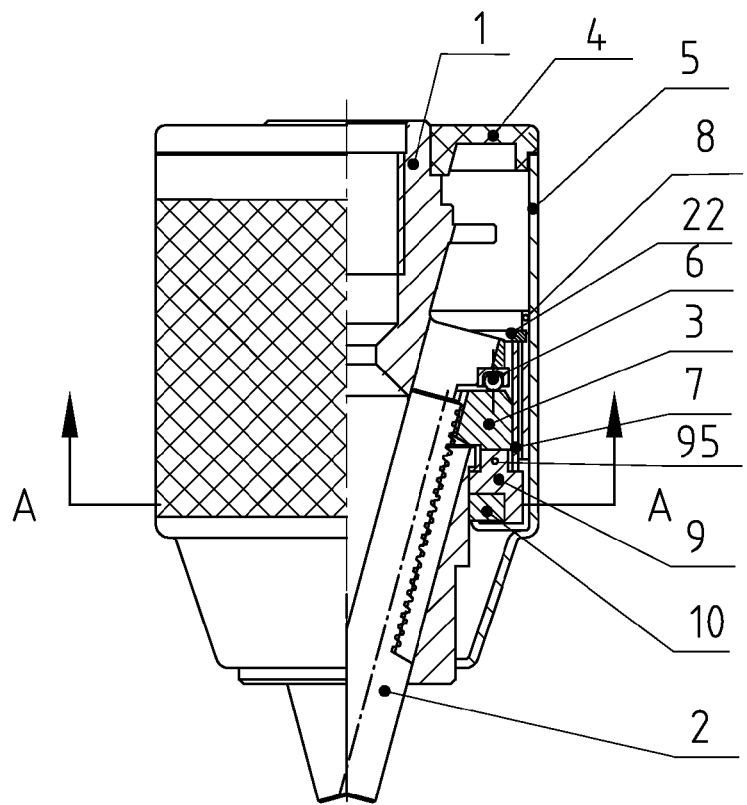
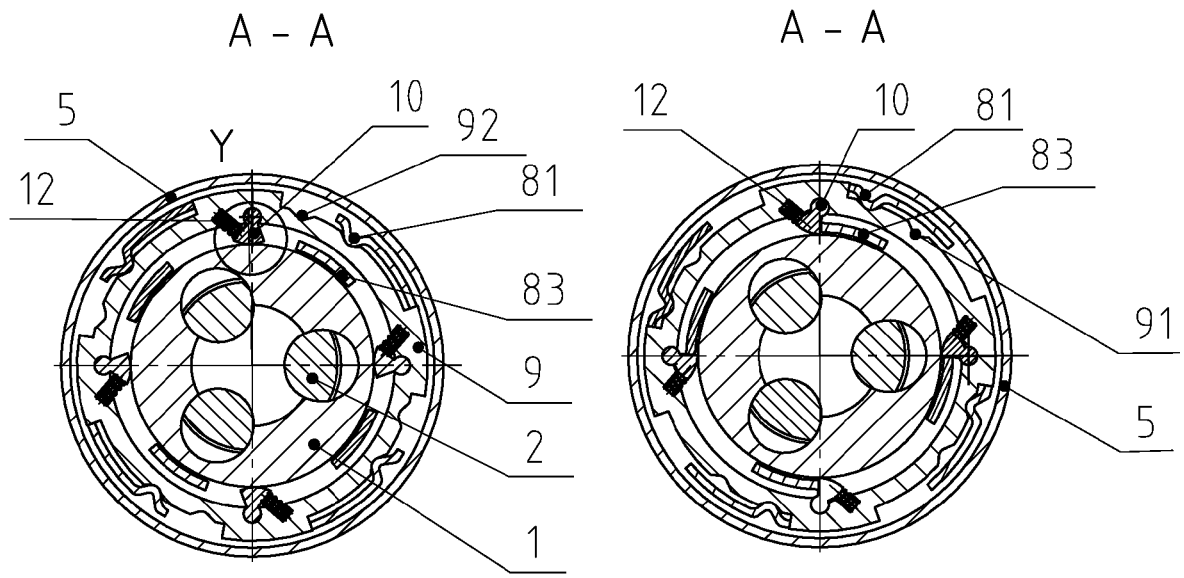
FIG. 1
FIG. 2   FIG. 3

Enlargement of Section Y

Enlargement of Section Y

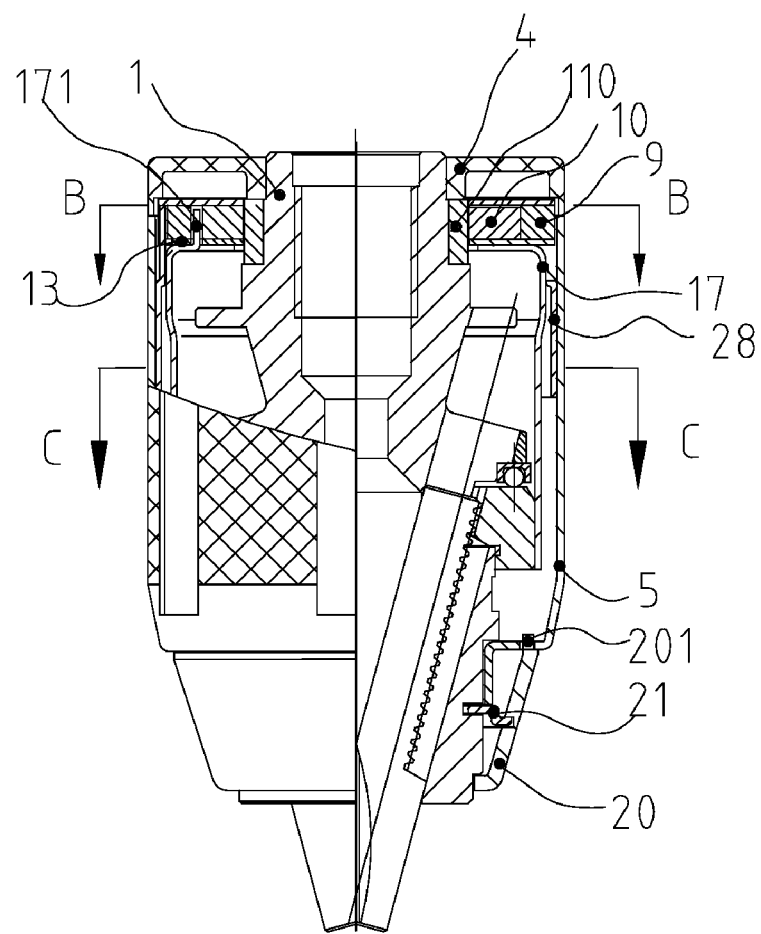
FIG. 10
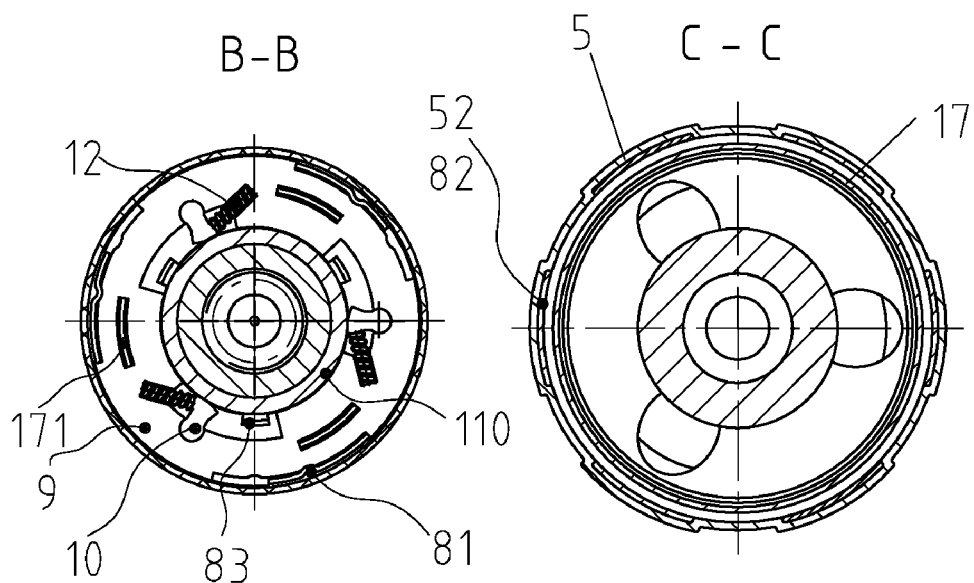
FIG. 11
FIG. 12

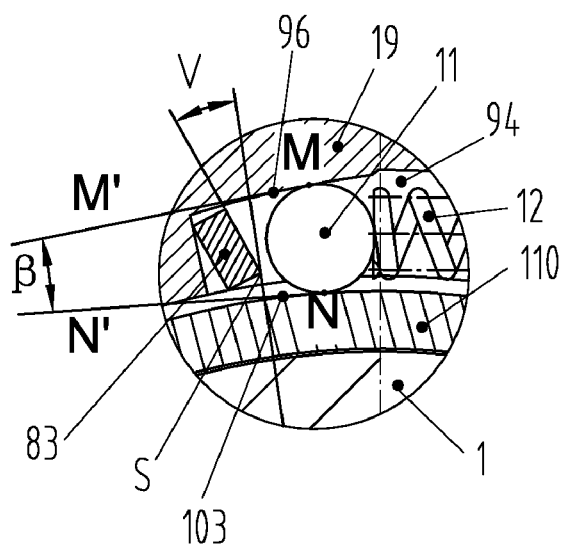
FIG. 26
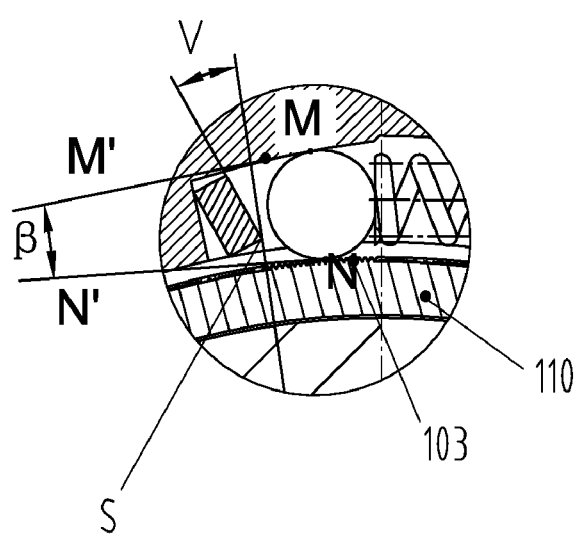
FIG. 27
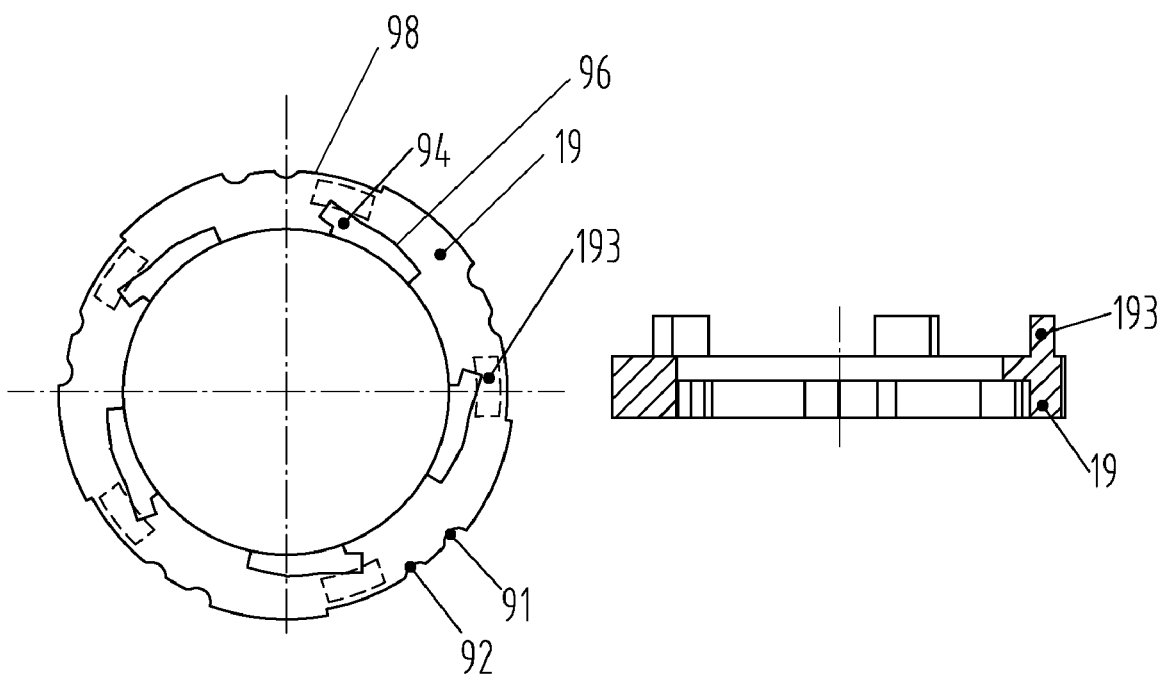
FIG. 28
FIG. 29

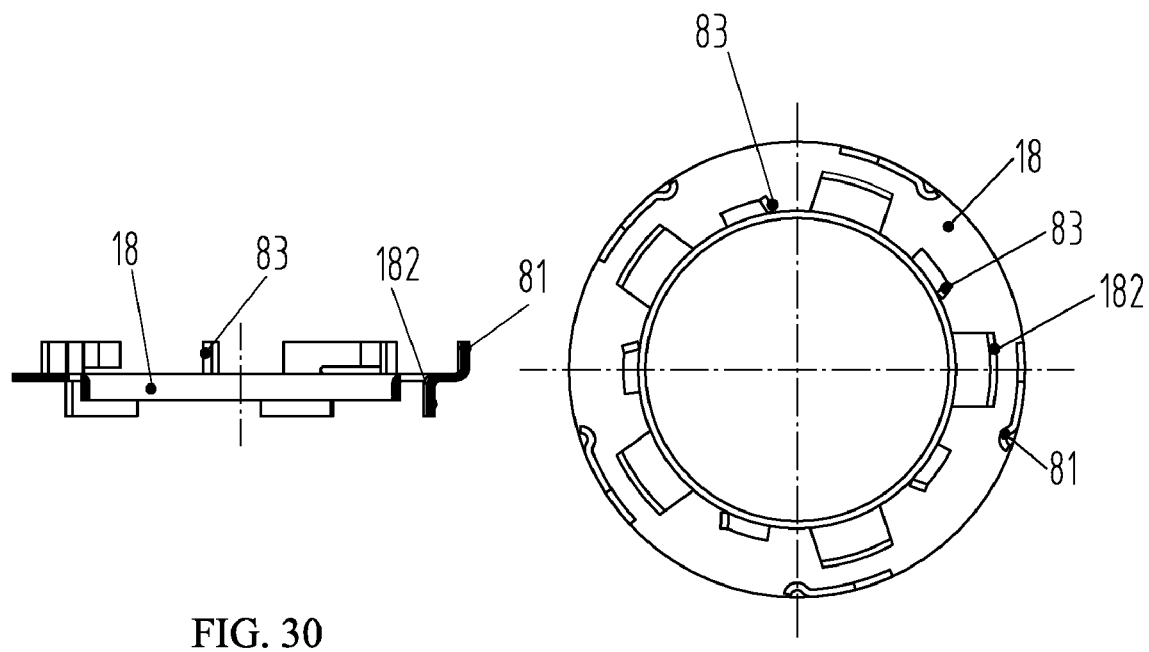
FIG. 30
FIG. 31
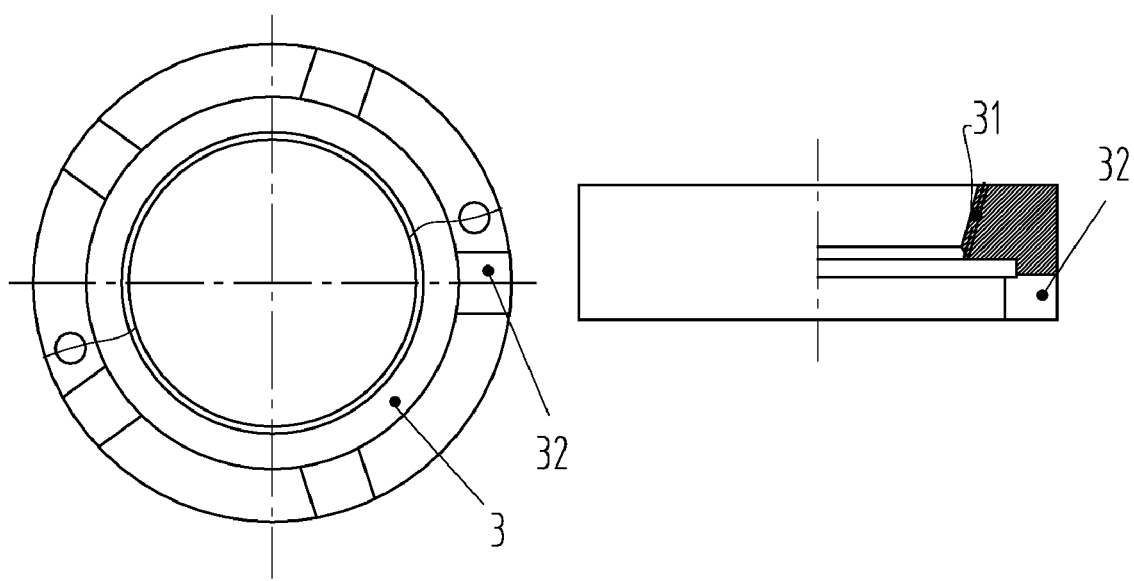
FIG. 32
FIG. 33

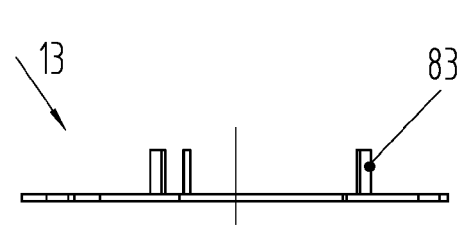
FIG. 36
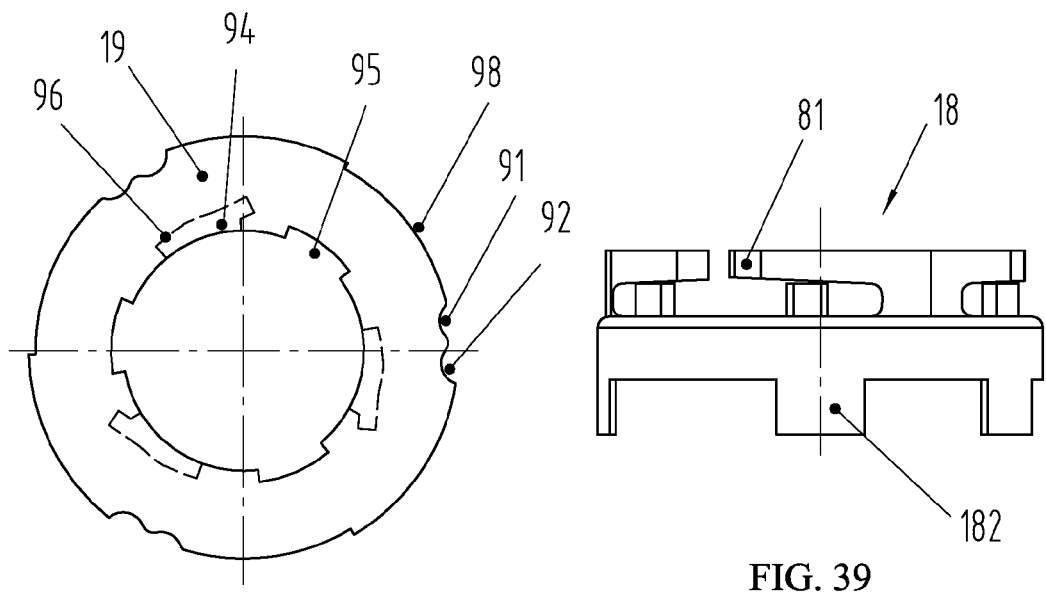
FIG. 39
FIG. 37
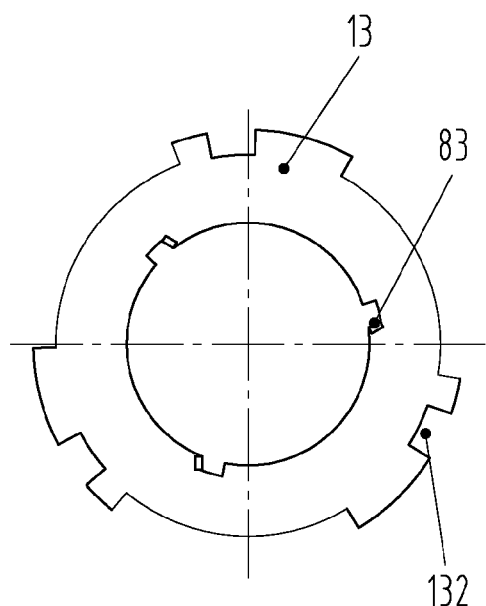
FIG. 38
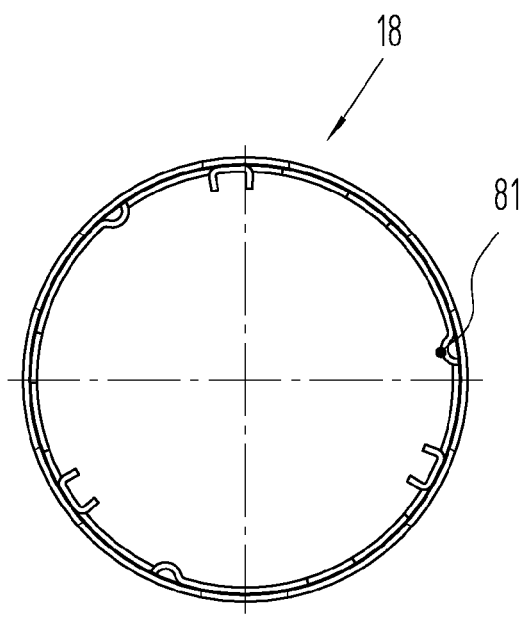
FIG. 40

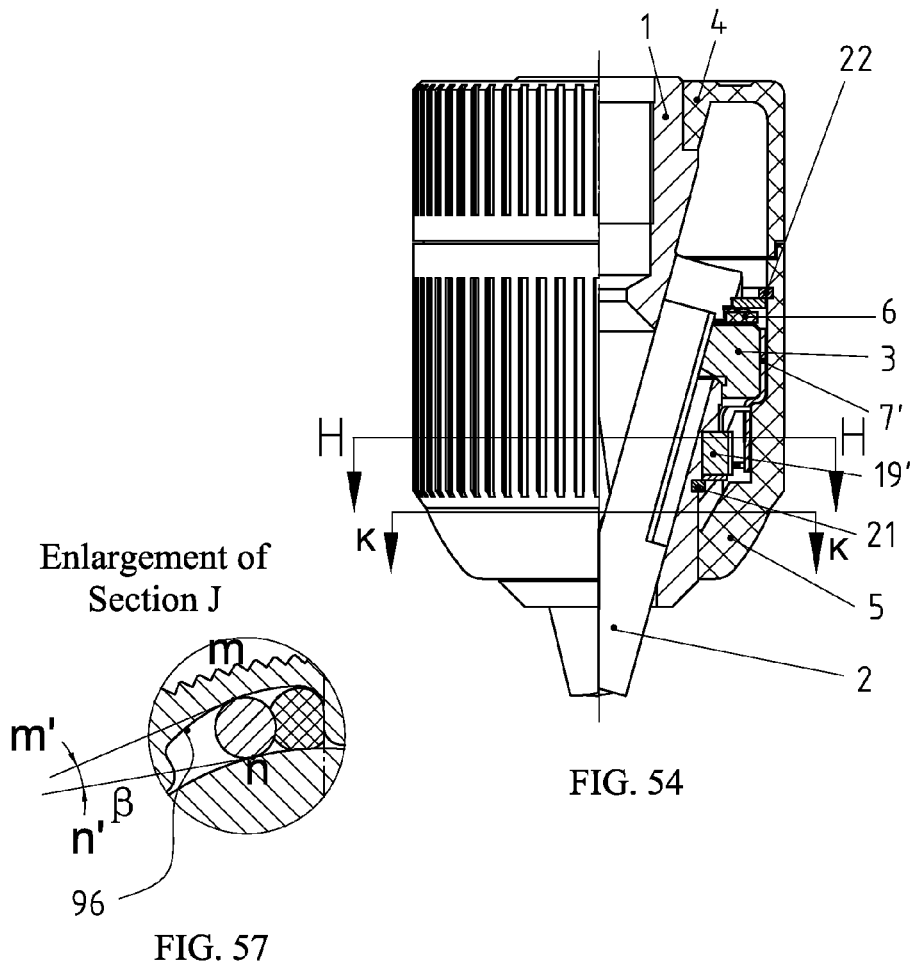
FIG. 54
Enlargement of Section J
FIG. 57
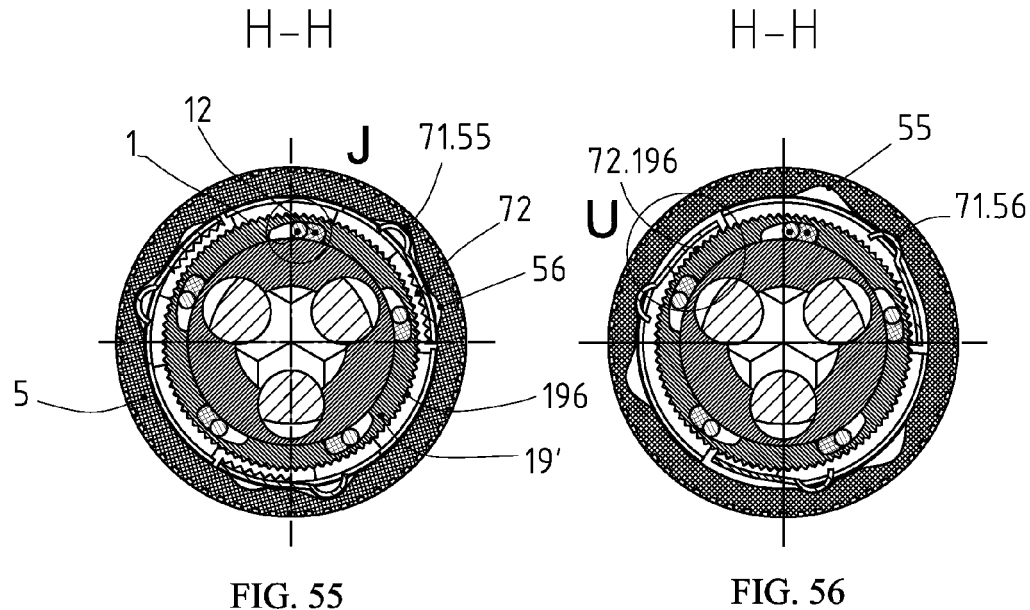
FIG. 55
FIG. 56

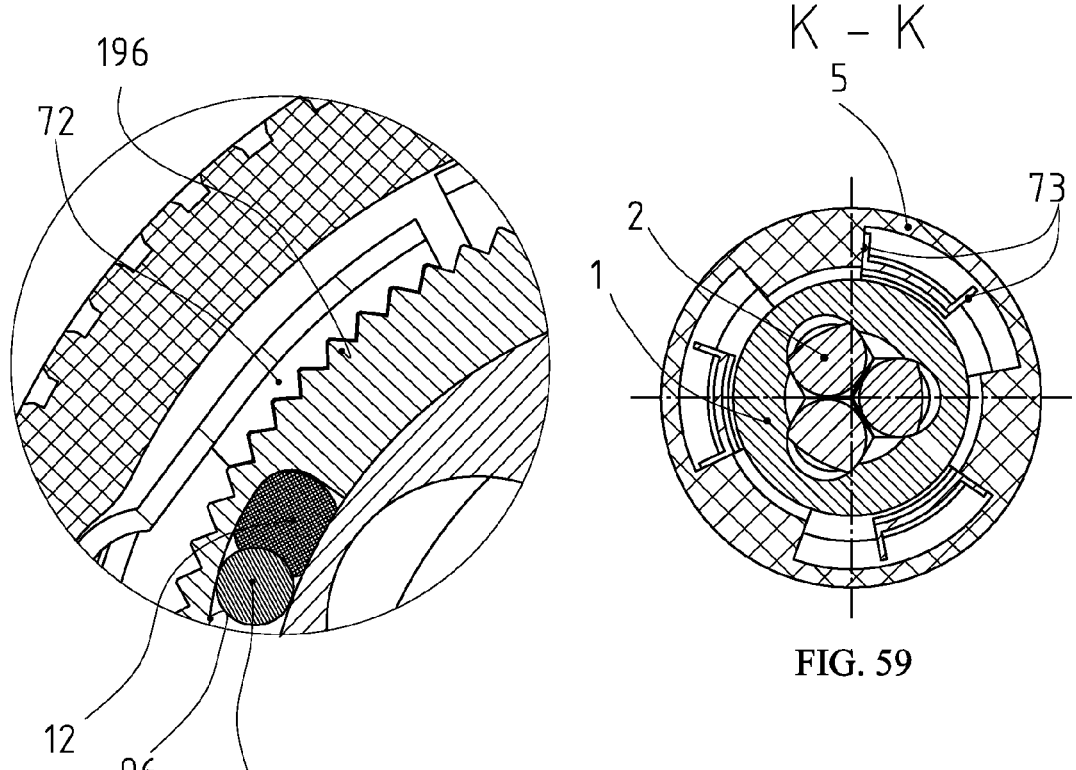
FIG. 58
FIG. 59
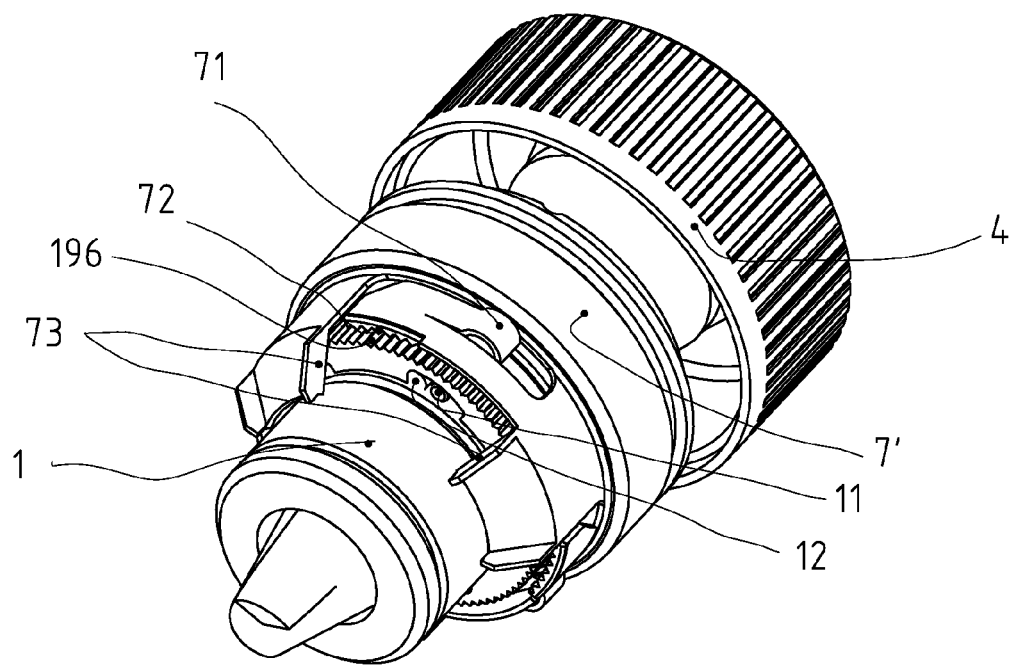
FIG. 60

DRILL CHUCK LOCKED THROUGH AN INCLINED WEDGE SURFACE

This application claims priority based on Chinese Patent Application Nos. 200610080642.2 filed on May 23, 2006 and 200620160510.6 filed on Nov. 21, 2006, which are both incorporated herein by reference.

TECHNICAL FIELD

The present invention relates to a gripping device for revolving tools, more particularly, to a drill chuck locked through an inclined wedge surface.

BACKGROUND ART

Conventional gripping devices for revolving tools are used to grip various revolving tools, such as aiguilles, reamers, screw taps and so on, and are also called as chuck. A typical chuck such as a drill chuck includes a drill body, plural jaws (e.g. three jaws), a nut, a sleeve etc., as well as a rear sleeve in certain cases. In addition, a bearing assembly may be included in a chuck in order to reduce friction. The plural jaws are mounted in plural inclined holes of the drill body with the inclined holes equally arranged in the drill body. The nut, provided in a nut groove of the drill body, cooperates with the thread of the jaws to form a thread transmission mechanism. The outer sleeve is fitted around the nut (and in some instances, a nut sleeve is fitted around the nut). The outer sleeve has keys thereon while the nut has key grooves corresponding to said keys thereon, such that the outer sleeve can be coupled with the nut sleeve (the nut) via the keys.

In operation, the outer sleeve can be rotated manually and sequentially drive the nut sleeve and/or nut. Afterward, the nut drives the jaws to move in the inclined holes of the drill body back and forth so as to urge the three jaws to open or close in order to release or grip tools.

Since a drill chuck is generally operated under the operating condition of vibration and impact, the nut tends to loosen due to inertia, making the jaws release a tool handle. Therefore, in operation, the nut needs to be repeatedly fastened for many times, which brings about an obstacle in production.

SUMMARY OF THE INVENTION

To resolve the existing problems in the prior technology, the object of the present invention is to provide a drill chuck locked through an inclined wedge surface which keeps the nut motionless with respect to the drill body in the manner of frictional locking and holds the jaws unloosened when gripping a fool handle.

In order to achieve the above object, the drill chuck locked through an inclined wedge surface according to the present invention is provided with a wedge block type lock ring or a rolling body type lock ring wherein a control member (e.g. a control sleeve) connected with the outer sleeve drives said lock ring which, in turn, drives the nut. When the lock ring is locked into stationary state by the inclined wedge surface, the nut is then locked, and therefore the jaws hold the tool handle firmly.

According to an aspect of the present invention, a drill chuck locked through an inclined wedge surface is provided, comprising a drill body connected at the rear end to the drive shaft of a power source and having plural inclined holes arranged equally and circumferentially, plural jaws mounted in the corresponding plural inclined holes of the drill body respectively and having threads on the outer side surface; a nut fitted around the drill body and having threads on the inner surface to engage with the threads of the jaws; an outer sleeve fitted around said drill body; a wedge block type lock ring ratably fitted around the drill body and driving the nut to rotate, wherein the wedge block type lock ring is pivotally connected with a wedge block and an elastic member biasing said wedge block with the wedge block having an inclined wedge surface frictionally locked with the locking surface of the drill body; a control sleeve connected with the outer sleeve and driving the wedge block type lock ring to rotate, and a poking claw rotating synchronously with the control sleeve, between a first and a second positions, with the poking claw disengaging from the wedge block in the first position while contacting with the same in the second position, wherein when the poking claw is in the first position, the inclined wedge surface is closely contacting with the locking surface, while when the poking claw is in the second position, the wedge block is dislocated, causing its inclined wedge surface to be out of contact with the locking surface.

Preferably, said poking claw is provided on the control sleeve on which a drive claw is also provided. The wedge block type lock ring is provided with a drive groove therein, wherein the wedge block type lock ring is driven to rotate through the cooperation between the drive claw and the drive groove.

Preferably, furthermore, a connecting sleeve and a poking claw member are provided, wherein the connecting sleeve is connected on the nut at its first end and is connected with the wedge block type lock ring at its second end, the poking claw is provided on the poking claw member which is connected with the control member; the control sleeve is provided with the drive claw thereon, and the wedge block type of lock ring is driven to rotate by the cooperation between the drive claw and the drive groove grooved on the wedge block type lock ring.

Preferably, said poking claw is provided on the control sleeve on which a drive claw is provided, wherein the drive claw cooperates with the drive groove grooved in the wedge block type lock ring to drive the wedge block type lock ring to rotate. In addition, a planet gear transmission mechanism is provided, comprising an inner teething ring, plural planet gears, a planet gear bracket, and a teething ring, wherein the planet gear bracket is connected with the nut and the wedge block type lock ring drives the inner teething ring to rotate.

Preferably, said inner teething ring and the wedge block type lock ring form a one-piece structure.

Preferably, the drive groove of the wedge block type lock ring is provided with a first drive position and a second drive position, and the drive claw is provided with an elastic projection portion. When the elastic projection portion is engaging with the first drive position, the poking claw is in the second position and when the elastic projection portion is engaging with the second drive position, the poking claw is in the first position.

Preferably, the inclined wedge surface of the wedge block is formed by an eccentricity camber with its circle center offsetting from the pivoting center of the wedge block.

Preferably, the angle between the common normal line of the inclined wedge surface and the locking surface and the connecting line of the pivoting center of the wedge block and the position of friction locking is smaller than or equal to the friction angle at the position of friction locking.

Preferably, the inclined wedge surface and the locking surface are rough surfaces.

According to another aspect of the present invention, a drill chuck locked through an inclined wedge surface is provided, comprising a drill body connected at the rear end to the drive shaft of a power source and having plural inclined holes arranged equally and circumferentially; plural jaws mounted in the plural inclined holes of the drill body respectively and having threads on the outer side surface; a nut fitted around the drill body and having threads in the inner surface to engage with the threads on the jaws; an outer sleeve fitted around the drill body; a rolling body type lock ring fitted rotatably around the drill body and driving the nut to rotate, wherein a rolling body and an elastic member biasing against the rolling body are provided therein and an inclined wedge surface is provided on the rolling body type lock ring, a control member connected with the outer sleeve to bring the poking claw to rotate between the first and second positions and drives the rolling body type lock ring to rotate, wherein the poking claw is apart from the rolling body when it is in the first position and contacting with the rolling body when it is in the second position; a poking claw rotating, simultaneously with the control member, between the first and second positions, wherein the poking claw is apart from the rolling body when it is in the first position and contacts with the rolling body when it is in the second position, wherein when the poking claw is in the first position, the rolling body contacts closely with both the locking surface of the drill body and the inclined wedge surface and the rolling body type lock ring and the drill body are frictionally locked in, while the poking claw is in the second position, the rolling body comes out of contact with the locking surface.

Preferably, the poking claw is provided on the control member which is mounted with a drive claw; and the wedge block type lock ring is provided with a drive groove wherein the drive claw and the drive groove cooperate with each other to drive the rolling body type lock ring to rotate.

Preferably, a connecting sleeve and a poking claw member connected to the control member are further provided, wherein the connecting sleeve is connected at the first end to the nut and at the second end with the wedge block type lock ring; the poking claw is provided on the poking claw member; and the control member is provided with a drive claw which cooperates with the drive groove grooved on the wedge block type lock ring to drive the rolling body type lock ring to rotate.

Preferably, the poking claw is provided on the control member which is mounted with a drive claw, wherein the drive claw cooperates with the drive groove grooved in the rolling body type lock ring to drive the rolling body type lock ring to rotate. Also, a planet gear transmission device is included, comprising an inner teething ring, plural planet gears, a planet gear bracket and a teething ring with the planet gear bracket connected with the nut and the rolling body type lock ring driving the inner teething ring to rotate.

Preferably, the inner teething ring and the rolling body type lock ring form a one-piece structure.

Preferably, the drive groove of the rolling body type lock ring is provided with a first drive position and a second drive position, and the drive claw is provided with an elastic projection portion, wherein when the elastic projection portion is engaging with the first drive position, the poking claw is in the second position, and when the elastic projection portion is engaging with the second drive position, the poking claw is in the first position.

Preferably, when the poking claw is in the first position, the rolling body is made to contact with the inclined wedge surface at a contacting point M and with the locking surface at a contacting point N, wherein the angle between the respective tangent lines of the inclined wedge surface and the locking surface is less than the sum of the respective friction angles of the points M and N.

Preferably, the poking claw is provided with a contacting surface to contact with the rolling body with the contracting surface provided slantingly.

Preferably, the locking surface is a rough surface with serrations.

Preferably, a locking bushing, connected fixedly to the drill body, is further included and the locking surface is the outer surface of the locking bushing.

Because of the above structure of the drill chuck locked through an inclined wedge surface according to the present invention, when the inclined wedge surface of the wedge block is closely contacting with the locking surface of the drill body, or when the rolling body is closely contacting with the inclined wedge surface of the rolling body type lock ring and the locking surface of the drill body respectively, the nut can be held moveless with respect to the drill body, therefore the state that the jaws grip the tool handle can continue without fastening the nut repeatedly. Also, the wedge block type lock ring or the rolling body type lock ring may be provided either at the front portion or at the rear portion of the drill body, which facilitates the arrangement of the mechanisms with other functions, such as a retreat locking mechanism used to prevent the jaws from retreating excessively. In addition, a planet gear transmission mechanism may be provided between the nut and the drill body in order to magnify the torque of the outer sleeve, such that the locking-in can be achieved by even very small torque.

It should be understood that the general description above and the detailed description below are all illustrative and descriptive, intended for further describing the present invention.

Other features and advantages of the present invention are given in the following description, partially seen from the description or the implementation of the present invention. Objects and other advantages of the present invention can be learned and obtained from the description, claims and accompanying drawings.

BRIEF DESCRIPTION OF THE DRAWINGS

The present invention can be understood more easily through the accompanying drawings constituting a part of this specification, which illustrate embodiments of the present invention and serve to explain the principle of the present invention together with the description.

FIG. 1 to 9 show the first embodiment of the drill chuck locked through an inclined wedge surface according to the present invention, in which:

FIG. 1 is a front cross sectional view of the first embodiment;

FIG. 2 is a cross sectional view taken along the line A-A in FIG. 1, wherein the drill chuck locked through an inclined wedge surface is in the state of locking;

FIG. 3 is a cross sectional view taken along the line A-A in FIG. 1, wherein the drill chuck locked through an inclined wedge surface is in the state of unlocking;

FIG. 4 is a partial enlargement view of the part Y in FIG. 2, wherein the drill body is illustrated with a smooth locking surface;

FIG. 5 is a partial enlargement view of the part Y in FIG. 2, wherein the drill body is illustrated with a serration and rough locking surface;

FIG. 6 is a cross sectional view of the control sleeve;

FIG. 7 is a perspective view of the control sleeve of FIG. 6;

FIG. 8 is a top view of the lock ring of wedge block type;

FIG. 9 is a perspective view of the lock ring of wedge block type shown in FIG. 8;

FIG. 10 to FIG. 22 show the second embodiment of the drill chuck locked through an inclined wedge surface according to the present invention, in which:

FIG. 10 is a front cross-sectional view of the second embodiment;

FIG. 11 is a cross sectional view taken along the Sine B-B in FIG. 10;

FIG. 12 is a cross sectional view taken along the line C-C in FIG. 10;

FIG. 13 is a front cross-sectional view of the outer sleeve;

FIG. 14 is a top view of the outer sleeve shown in FIG. 13;

FIG. 15 is a cross sectional view of the control sleeve;

FIG. 16 is a top view of the control sleeve shown in FIG. 15;

FIG. 17 is the front cross sectional view of the connecting sleeve;

FIG. 18 is a top view of the connecting sleeve shown in FIG. 17;

FIG. 19 is a front view of the poking claw member;

FIG. 20 is a top view of the poking claw member shown in FIG. 19;

FIG. 21 is a tope view of the lock ring of wedge block type;

FIG. 22 is a cross sectional view of the lock ring of wedge block type shown in FIG. 21;

FIG. 23 to 33 show the third embodiment of the drill chuck locked through an inclined wedge surface according to present invention, in which:

FIG. 23 is a front view of the third embodiment;

FIG. 24 is a cross sectional view taken along the line D-D in FIG. 23, wherein the drill chuck locked through an inclined wedge surface is in the state of locking;

FIG. 25 is a cross sectional view taken along the line D-D in FIG. 23, wherein the drill chuck locked through an inclined wedge surface is in the state of unlocking;

FIG. 26 is a partial enlargement view of the part 1 in FIG. 24, wherein the locking surface of bushing is the smooth locking surface;

FIG. 27 is a partial enlargement view of the part 1 in FIG. 24, wherein the locking surface of bushing is the thread and rough locking surface;

FIG. 28 is a bottom view of the lock ring of rolling body type;

FIG. 29 is a front cross sectional view of the lock ring of rolling body type shown in FIG. 28;

FIG. 30 is a front cross sectional view of the control member;

FIG. 31 is a top view of the control member shown in FIG. 30;

FIG. 32 is a bottom view of the separated nut, wherein individual parts of the separated nut are combined together;

FIG. 33 is a half cross sectional view of the separated nut shown FIG. 32;

FIG. 34 to 40 show the fourth embodiment of the drill chuck locked through an inclined wedge surface according to the present invention, in which:

FIG. 34 is a front cross sectional view of the fourth embodiment;

FIG. 35 is a cross sectional view taken along the line E-E in FIG. 34;

FIG. 36 is a top view of the ring body of the rolling body;

FIG. 37 is a front view of the poking claw member;

FIG. 38 is a top view of the poking claw member shown in FIG. 37;

FIG. 39 is a front view of the control sleeve;

FIG. 40 is a top view of the control sleeve shown in FIG. 39;

FIG. 41 to 50 show the fifth embodiment of the lock ring of wedge block type according to the present invention, in which:

FIG. 41 is a front view of the fifth embodiment;

FIG. 42 is a cross sectional view taken along the line F-F in FIG. 41;

FIG. 43 is a cross sectional view taken along the line G-G in FIG. 41;

FIG. 44 is a bottom view of the control member;

FIG. 45 is a front view of the control member shown in FIG. 44;

FIG. 46 is a front cross sectional view of the planet gear bracket;

FIG. 47 is a top view of the planet gear bracket shown in FIG. 46;

FIG. 48 is a bottom view of the lock ring of wedge block type;

FIG. 49 is a front cross sectional view of the lock ring of wedge block type shown in FIG. 48;

FIG. 50 is a top view of the outer sleeve;

FIG. 51 to 53 is the sixth embodiment of the drill chuck locked through an inclined wedge surface according to the present invention, in which:

FIG. 51 is a cross sectional view taken along the line F-F in FIG. 41;

FIG. 52 is a bottom view of the ring body of the rolling body;

FIG. 53 is a front cross sectional view of the ring body of the rolling body;

FIG. 54 is a front cross sectional view of the drill chuck locked through an inclined wedge surface according to the present invention;

FIG. 55 is a top cross sectional view taken along the line H-H in FIG. 54;

FIG. 56 is a top cross sectional view taken along the line H-H in FIG. 54, wherein the drill chuck is in the state of locking;

FIG. 57 is a partial enlargement view of the part J in FIG. 55, showing the structure and position relations between the lock ring of rolling body type, the rolling body and the elastic member;

FIG. 58 is a partial enlargement view of the part U in FIG. 56, wherein the connecting teeth on the nut sleeve and the connecting teeth on the lock ring of rolling body type are in the state of connecting;

FIG. 59 is a cross sectional view taken along the line K-K in FIG. 54;

FIG. 60 is a perspective view of the drill chuck shown in FIG. 54, wherein the outer sleeve is removed;

DESCRIPTION OF PREFERRED EMBODIMENTS

Figure 4:
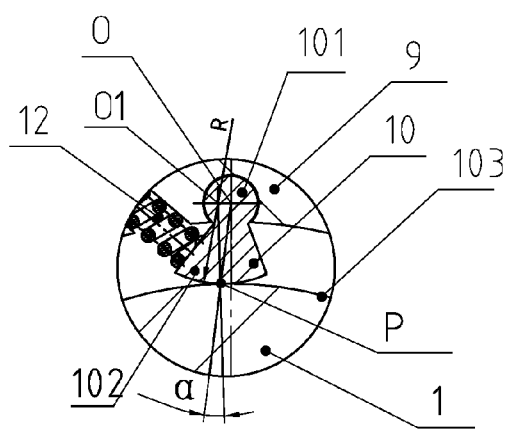

The drill chuck locked through an inclined wedge surface according to the present invention will be described in detail in conjunction with accompanying drawings and embodiments, in which same components are throughout represented by the same reference numbers.

First Embodiment

FIG. 1 to 9 show the first embodiment of the drill chuck locked through an inclined wedge surface according to the present invention. As shown in FIG. 1, the drill chuck locked through an inclined wedge surface comprises a drill body 1, jaws 2, a nut 3, a rear sleeve 4, an outer sleeve 5, a bearing assembly 6, a nut sleeve 7, a control sleeve 8, a wedge block type lock ring 9, a wedge block 10, an elastic member 12, and a snap spring 22. The drill body 1 is provided with three inclined holes with their axes intersecting at one point in the axis of the drill body. The three inclined holes of the drill body 1 are respectively mounted with movable jaws 2 which are provided on one side with partial threads and are provided on the other side with ridge which is parallel to the axis of the drill body 1 and is used for gripping the tool handle. The nut 3 is fitted around the drill body 1 and has female thread adapted for engaging with the partial thread of the jaw 2, such that the rotation of the nut 3 can make the jaws 2 slide in the inclined holes of the drill body 1 so as to make the jaws 2 grip or release the tool handle. The jaws are driven by the nut uniquely, therefore during the operation of the drill chuck, once the nut is made relatively moveless with respect to the drill body, i.e., locking the nut, the jaws will keep the status of gripping the tool handles for all time. Hereafter, individual components used for locking the nut frictionally will be described in detail.

Figure 6:
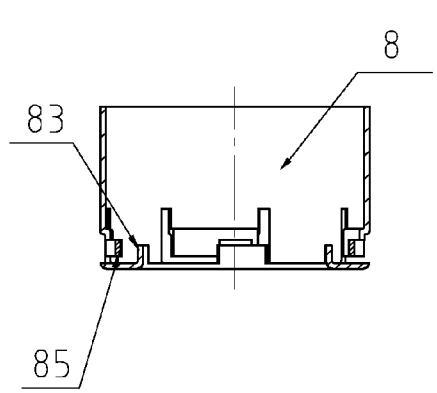
Figure 7:
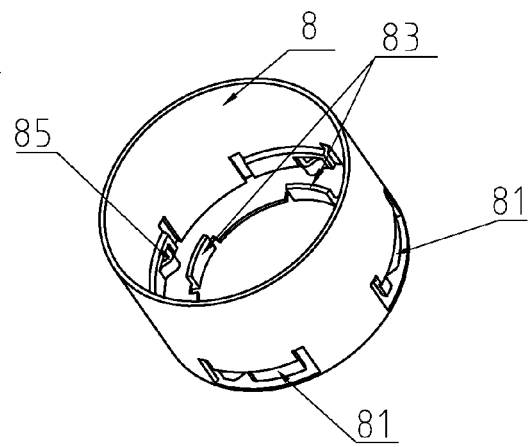

Referring to FIGS. 6 and 7, it can be understood that the control sleeve 8 is fixedly connected to the outer sleeve 5 and has plural drive claws 81 on the lower end wall and plural poking claws 83 located at the inner side of the drive claws 81.

Figure 8:
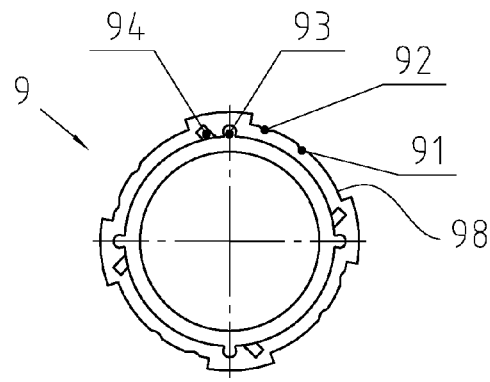
Figure 9:
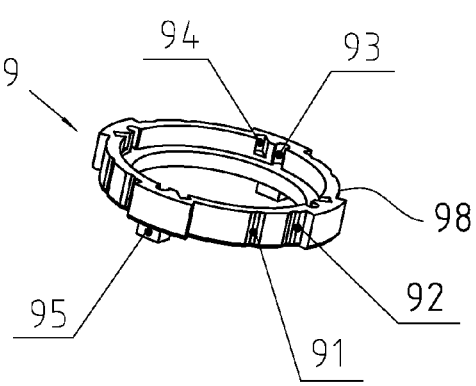

Referring to FIGS. 8 and 9, it can be understood that the inclined wedge type of lock ring 9 is rotatably fitted around the drill body 1 with gap therebetween and provided thereon with plural force-transfer keys used to be inserted and connected in the drive groove 32 of the nut 3, so as to rotate simultaneously with the nut 3 (the nut 3 as shown in FIGS. 32 and 33). The lock ring 9 is provided on the inner side with a wedge block support position 93 for mounting the wedge block 10 and an elastic member mounting position 94 for mounting the elastic member 12, and provided on the outer side with plural drive grooves 98 on the circumferential side wall of which a first drive position 91 and the second drive position 92 are provided.

Referring to FIGS. 2 and 3, it can be understood that the wedge block 10 is pivotally connected to the wedge block type lock ring 9, i.e., the wedge block 10 is rotatably mounted on the wedge block support position 93 of the wedge block type lock ring 9 through a support portion 101 and provided thereon with an inclined wedge surface 102 contacting with the locking surface 103 of the drill body (i.e., the outer cylinder surface 13 of the drill body at the position of the wedge block type lock ring 9). The elastic member 12, such as a spring, is mounted on an elastic member mounting position 94 located on one side of the wedge 10, to bias against the wedge block 10.

The control sleeve 8 is rotatably provided, wherein its poking claws 83 are interposed between the locking surface 103 of the drill body and the wedge block type lock ring 9 and the drive claw 81 is dislocatedly provided in the drive grooves 98. When the control sleeve 8 rotates, the wedge block type lock ring 9 is driven to rotate simultaneously through the contact between the side surfaces of the drive claws 81 and the drive grooves 98. The drive claws 81 are provided thereon with elastic projection portions 85 which can engage with the first and second drive positions 91 and 92 respectively, in order to elastically locking the relatively position of the control sleeve 8 with respect to the wedge block type lock ring 9.

The gripping procedure of the drill chuck locked through an inclined wedge surface is as follows:

In the state of unlocking shown in FIG. 3, the drive claw 81 engages with the second drive position 92, at the same time, the poking claw 83 lifts the wedge block 10, such that the inclined wedge surface 102 of the wedge block 10 and the locking surface 103 are not in a contacting condition. When the control sleeve 8 is driven to rotate by the positive rotation of the outer sleeve 5, the wedge block type lock ring 9 is driven to rotate simultaneously due to the engagement between the drive claws 81 and the second drive position 92. At the same time, the nut is rotated with respect to the jaws, such that the jaws 2 move forwards and grip the tool handle (not shown in drawings) by the thread transmission. During the further rotation, since the jaws 2 grip the tool handle, the lock ring 9 is applied with a greater moment of resistance, thereby the drive claw 81 slides out from the second drive position 92 against the elastic force, and rotates into the first drive position 91 and engages with it. At the same time, the poking claw 83 is apart from the wedge block 10, as the state of locking shown in FIG. 2. Under the elastic force of the elastic member 12, the wedge surface 102 comes into contact with the locking surface 103. Herein, the side surface of the drive claw 81 is exactly contacting with the side wall of the drive groove 98.

When the moment rotating the outer sleeve is further increased, the wedge block type lock ring 9 drives the wedge block 10 to rotate with respect to the locking surface 103 of the drill body 1 while the inclined wedge surface 102 slides on the locking surface 103 until the jaws 2 completely grip the tool handle.

Figure 5:
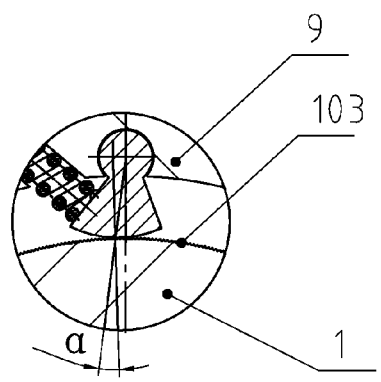

Referring to FIGS. 4 and 5, it can be found that the inclined wedge surface 102 and the locking surface 103 contact with each other at the point P, wherein the inclined wedge surface 102 consists of an eccentricity camber with the point O1 as a circle center and with R as a radius, and the circle center O1 offsets from the center O of turning circle of the wedge block. The angle between the common normal lines O1P and OP of the inclined wedge surface and the locking surface is α. In this case, through changing the position of the circle center O1 and the magnitude of the radius R, the angle α may be changed or the rough level of the locking surface 103 is changed. For example, the friction angle of the smooth locking surface 103 at the point P shown in FIG. 4 is smaller than that of the rough locking surface 103 with serration shown in FIG. 5. Of course, the magnitude of the friction force at the point P may be changed through changing the rough level of the inclined wedge surface, such that the angle α is less than or equal to the friction angle at the point P and the wedge block 10 along with the wedge block type lock ring 9 are in the state of frictional locking with respect to locking surface 103, therefore, the wedge lock type lock ring 9 can not be moved reversely with respect to the locking surface 103, i.e., the nut and the jaws can not move reversely with respect to each other. Furthermore, the wedge block 10 is applied by the elastic force of the elastic member 12, assuring that the tool handle is gripped firmly by jaws without being loosened under the operating condition of vibration. In addition, in the case of a lager elastic force of the elastic member 12, the angle α may be slightly larger than the friction angle of the point P.

To release the tool handle gripped by the jaws, the outer sleeve is simply rotated reversely, making the drive claw 81 slide from the drive position 91 to the drive position 92, and at the same time, the poking claw is simultaneously moved and pushes the inclined wedge surface 102 into the position where it disengages with the locking surface 103, therefore the wedge block type lock ring may rotate reversely and then the state of locking is cancelled.

Second Embodiment

FIG. 10 to 22 show the second embodiment of the drill chuck locked through an inclined wedge surface according to the present invention which has the difference from the first embodiment that the wedge block type lock ring 9 is placed at the rear portion of the drill body 1.

Figure 13:
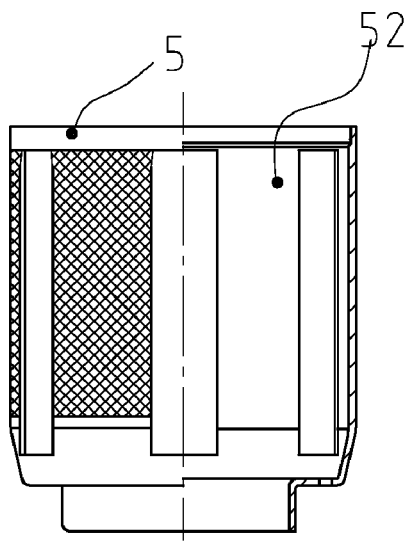
Figure 14:
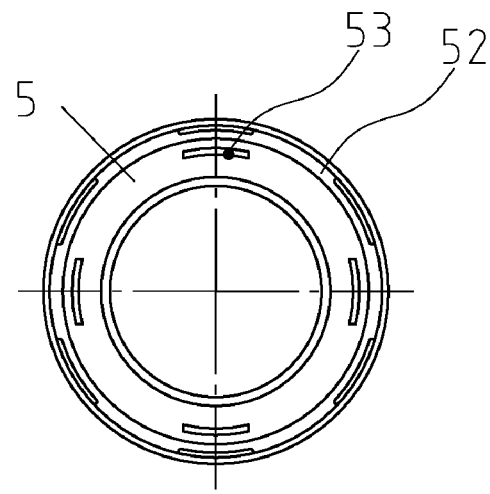

Referring to FIGS. 10, 13 and 14, it can be found that the outer sleeve 5 has a key groove 52 and a hole 53 in the inner wall. The front cover 20, fitted around the front portion of the drill body 1, is axially fixed on the drill body through a clip ring 21 and provided thereon with a key 201 cooperating with the hole 53, therefore the front cover 20 and the outer sleeve 5 are connected together through the cooperation between the key 201 and the key hole 53.

Figure 15:
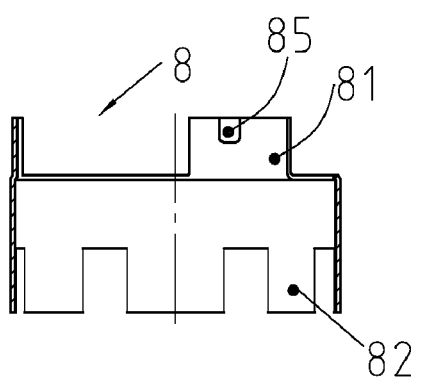
Figure 16:
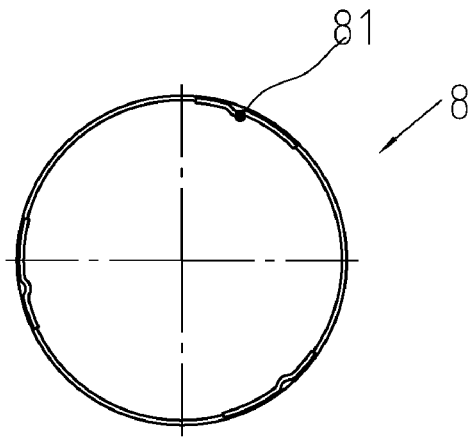

Referring to FIGS. 15 and 16, it can be found that the control sleeve 8 is provided at the lower end with plural drive keys 82 which cooperate insertedly with the key groove 52 of the outer sleeve 5 (as shown in FIG. 12), therefore, the outer sleeve 5 drives the control sleeve 8 to rotate. Plural drive claws 81 are formed at the upper end of the control sleeve 8, in order to drive the poking claw member 13 mentioned later.

Figure 17:
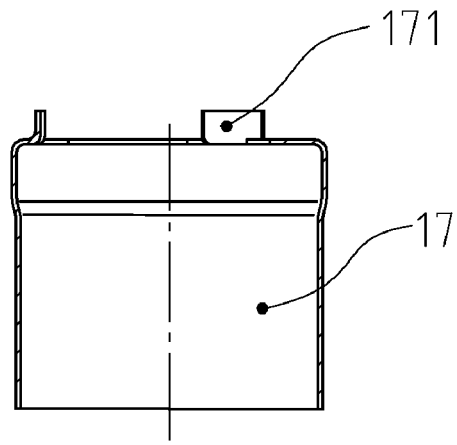
Figure 18:
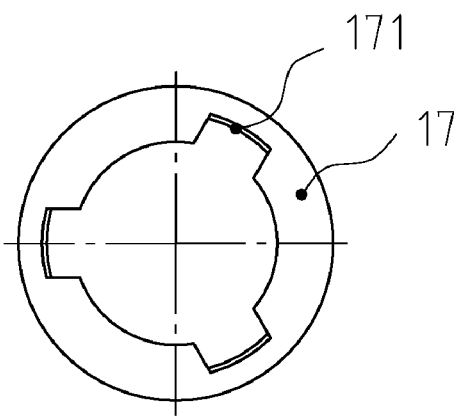

Referring to FIGS. 17 and 18, it can be found that the connecting sleeve 17, which has a force-transfer key 171 at the upper end, is fitted around the nut 3 and drives the nut 3 to rotate.

Figure 19:
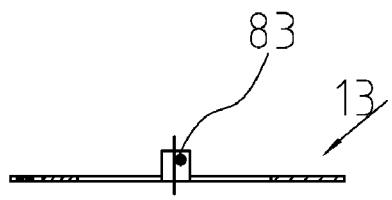
Figure 20:
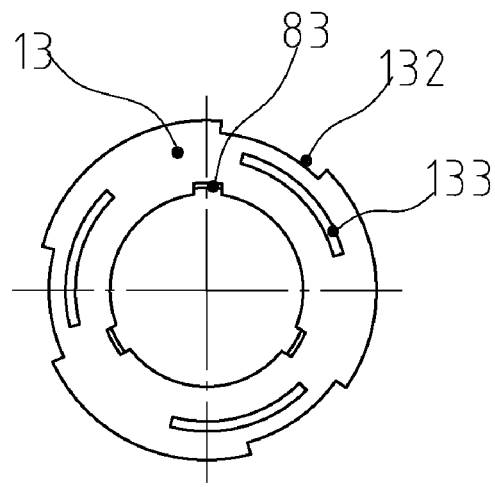

Referring to FIGS. 19 and 20, it can be found that the poking claw member 13 has poking claws 83 in the inner side and grooves 132 at the outer side. During assembly, the drive claws 81 of the control sleeve 8 pass through the grooves 132 of the poking claw member to make the poking claw member 13 and the control sleeve 8 rotate simultaneously. In this way, the control sleeve 8 are combined together with the poking claw member 13, severing as the control sleeve of the first embodiment in function.

Figure 21:
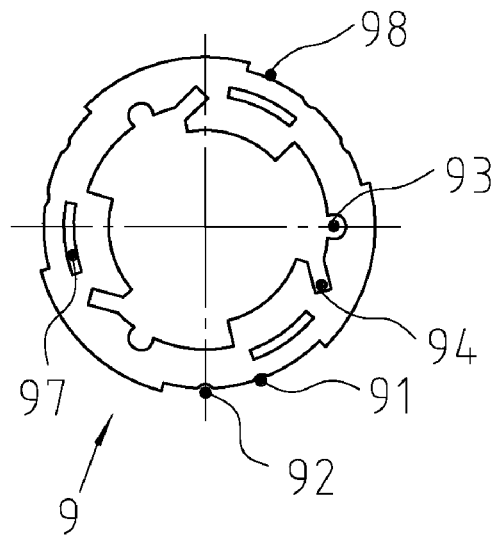
Figure 22:
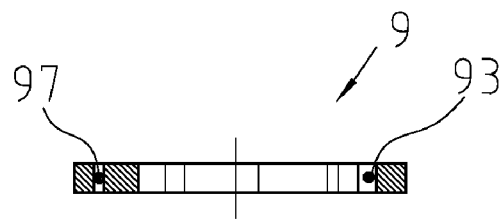
Figure 23:
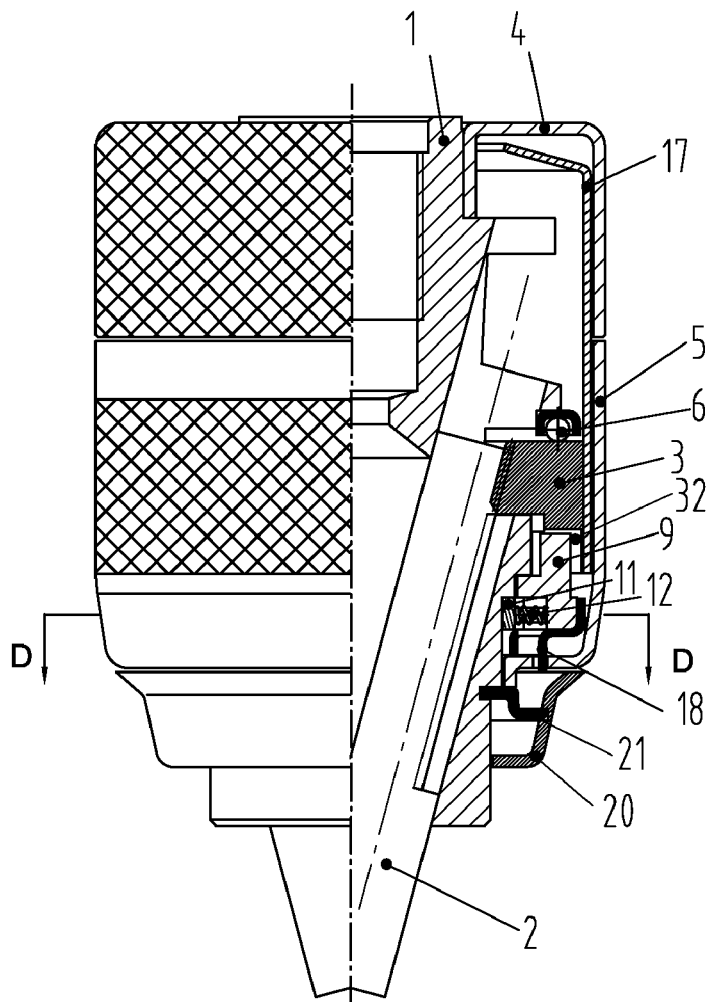

Referring to FIGS. 21 and 22, it can be found that besides the drive grooves 98, the first and second drive positions 91 and 92 located in the drive groove 98, the wedge block mounting positions 93, and the elastic member mounting positions 94 provided on the lock ring 9, the lock; ring 9 is also provided with force-transfer groove or holes 97. The force-transfer key 171 of the connecting sleeve 17 are connected insertedly with the force-transfer hole 95 of the wedge block type lock ring 9 to cooperate with each other, such that the wedge block type lock ring 9 and the connecting sleeve 17 have the relation of simultaneous rotation, so as to directly control the rotation of the nut 3.

Referring to 11, it can be found that a locking bushing 110 is provided between the wedge block 10 and the drill body 1 and fitted fixedly around the drill body 1, forming the locking surface at its outer peripheral surface, with the locking and releasing manners same as those of the first embodiment, therefore said manners are not described redundantly herein.

Third Embodiment

FIG. 23 to 33 show the third embodiment of the drill chuck locked through an inclined wedge surface according to the present invention in which the locking is achieved by a rolling body and the inclined wedge surface.

Referring to FIGS. 28 and 29, it can be found that the rolling body type lock ring 19 is rotatably mounted around the drill body 1 and provided thereon with plural force-transfer keys 193 for connecting insertedly with the drive groove 32 of the nut 3, so as to simultaneously rotate with the nut 3. The rolling body type lock ring 19 is provided in the inner side with elastic member mounting positions 94 and inclined wedge surfaces 96, wherein the elastic member mounting position 94 is used for mounting an elastic member 12, such as a spring, which biases against a rolling body 11 provided on one side of the elastic member 12, i.e. applies an elastic force on the rolling body 11. The rolling body type lock ring 9 is provided on the outer side with the drive grooves 98 which are provided with the first, drive positions 91 and the second drive positions 92 at the circumferential surface. The arrangement of the drive grooves 98 and the first and second drive positions 91, 92 are same as that of the previous embodiments.

Referring FIGS. 30 and 31, it can be found that the control member 18 is provided with drive keys 182, poking claws 83 and drive claws 81. The drive key 182 is used to connect insertedly with the hole of the outer sleeve 5, such that the outer sleeve 5 brings the control member 18 to rotate. As shown in FIGS. 32 and 33, the nut 3 is provided at the inner side with thread 31 for thread transmission with the jaws and provided at the lower end with plural drive grooves 32 for connecting insertedly with the said rolling body type lock ring 19 to form simultaneous transmission.

Figures 24, 25:
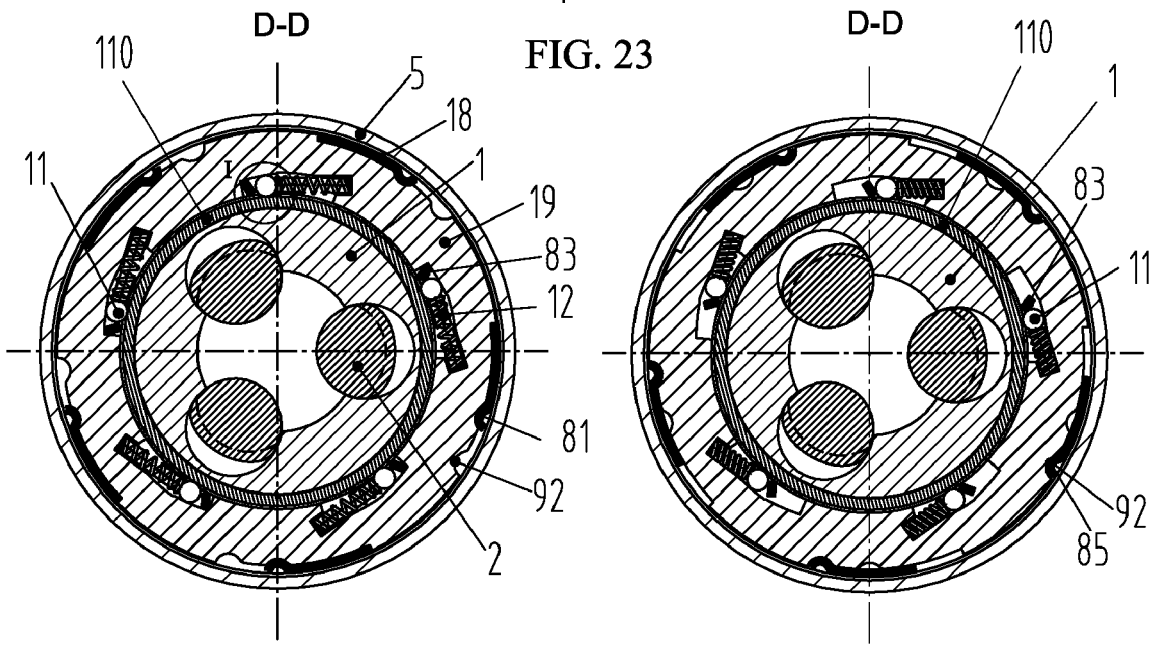
Figure 34:
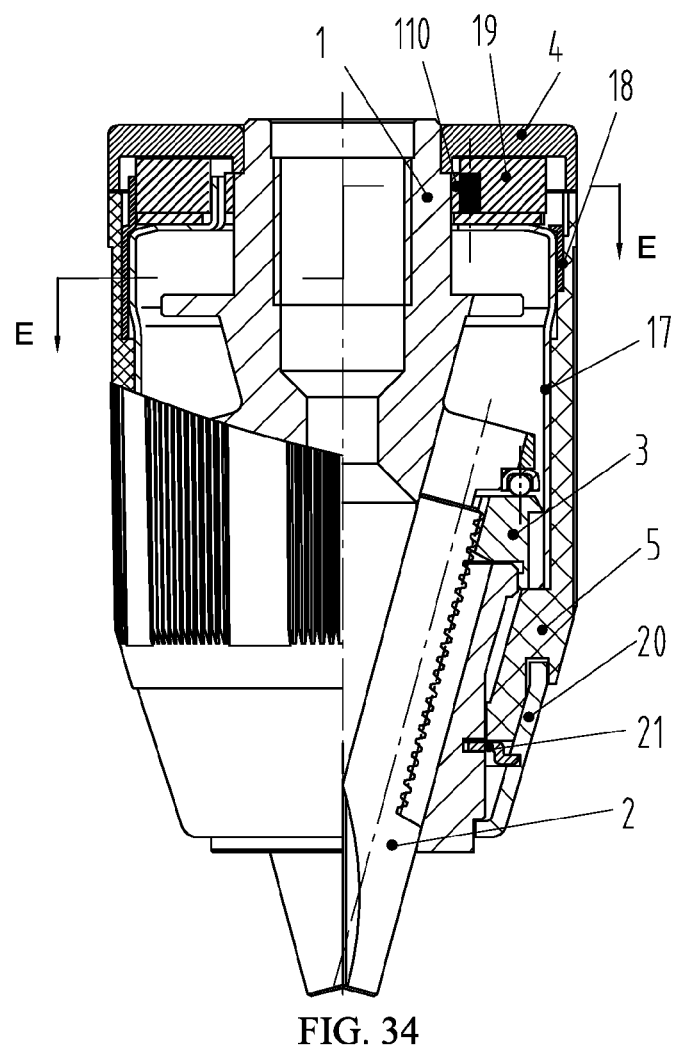
Figure 35:
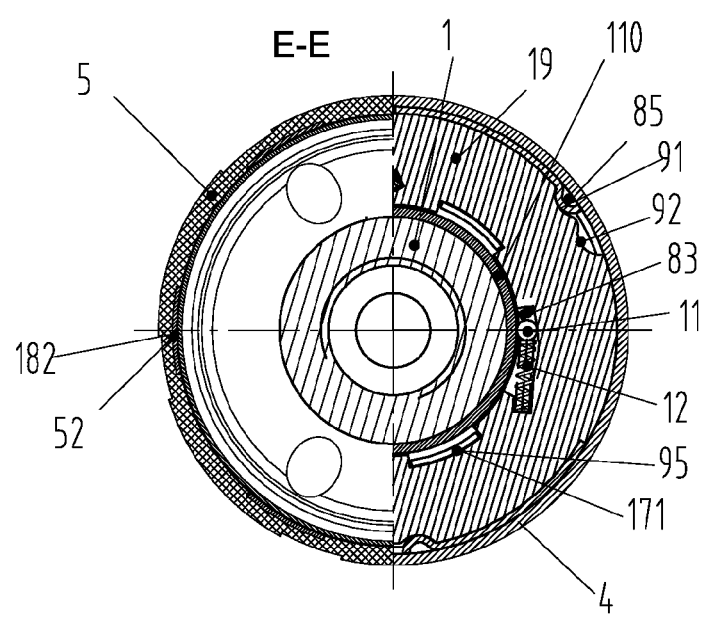

FIG. 24 illustrates the locking state of the present embodiment and FIG. 25 illustrates the unlocking state of the present embodiment. In FIG. 25, the poking claw 83 is located in a limit position and the elastic projection portion 85 of the drive claw 81 is exactly engaging with the second drive position 92. Herein, the poking claw 83 closely contacts with the rolling body 11, the elastic member 12 is compressed, and the rolling body 11 is apart from the inclined wedge surface 96 with a gap between itself and the locking surface 103 (said locking surface is provided on the locking bushing 110 fitted fixedly around the drill body), therefore the rolling body type lock ring may be driven positively and reversely. When the control member 18 is rotating and the poking claw 83 is located in the position shown in FIG. 24, the elastic projection portion 85 of the drive claw 81 is positioned by the engagement with the first drive position 91, the poking claw 83 apart from the rolling body 11 is located in another limit position, and the rolling body 11 applied by the elastic force of the elastic member 12 contacts closely with the inclined wedge surface 96 and the locking surface 103 respectively, therefore the rolling body type of lock ring 19 is frictionally locked with the drill body through the rolling body.

Referring to FIGS. 26 and 27, it can be understood that the rolling body 11 contacts with the inclined wedge surface 96 at the contacting point M and contacts with the locking surface 103 at the contacting point N. The angle between the tangent line MM' of the inclined wedge surface 196 of the rolling body type lock ring 19 and the tangent line NN' of the locking surface 103 is β which should be less than the sum of the respective friction angles at points M and N in the case of very weak elastic force of the elastic member 12. The contacting surface of the poking claw 83 with respect to the rolling body 11 and the normal line of the locking surface passing through the point S of the poking claw 83 form an acute angel V therebetween, i.e., the poking claw 83 is slantingly provided, and the actual angle V functions as follows: when the drive claw 81 is engaging with the second drive position 92, the elastic force applied by the elastic member on the rolling body drives the rolling body 11 to move along the inclined surface of the angle V and approach the inclined wedge surface 196 to come out of contact with the locking surface 103, resulting in more flexibility in rotating.

Fourth Embodiment

FIG. 34 to 40 show the fourth embodiment of the drill chuck locked through an inclined wedge surface according to the present invention which has the difference from the third embodiment that the rolling body type of lock ring 19 is located at the rear portion of the drill body and, similarly to the second embodiment, one poking claw member is also separated from the control sleeve or the control member.

Referring to FIG. 36, it can be found that besides the drive grooves 98, the first and second drive positions 91 and 92, and the inclined wedge surface 96 provided on the rolling body type lock ring 19, the rolling body type lock ring 19 is also provided with force-transfer grooves or holes 95 for connecting insertedly with (not shown in the drawings) the force-transfer keys 171 of the force-transfer sleeve 17, so as to drive the nut 3 to rotate.

Referring to FIGS. 37 and 38, it can be found that the poking claw member 13 is provided with the poking claws 83 and the drive grooves 132. Referring to FIGS. 39 and 40, it can be understood that the control member 18 is provided with the drive claws 81 and the drive keys 182, wherein the drive keys 182 are used for connecting insertedly with the key grooves 52 of the outer sleeve 5 so as to achieve the simultaneous rotation.

Fifth Embodiment

Figure 41:
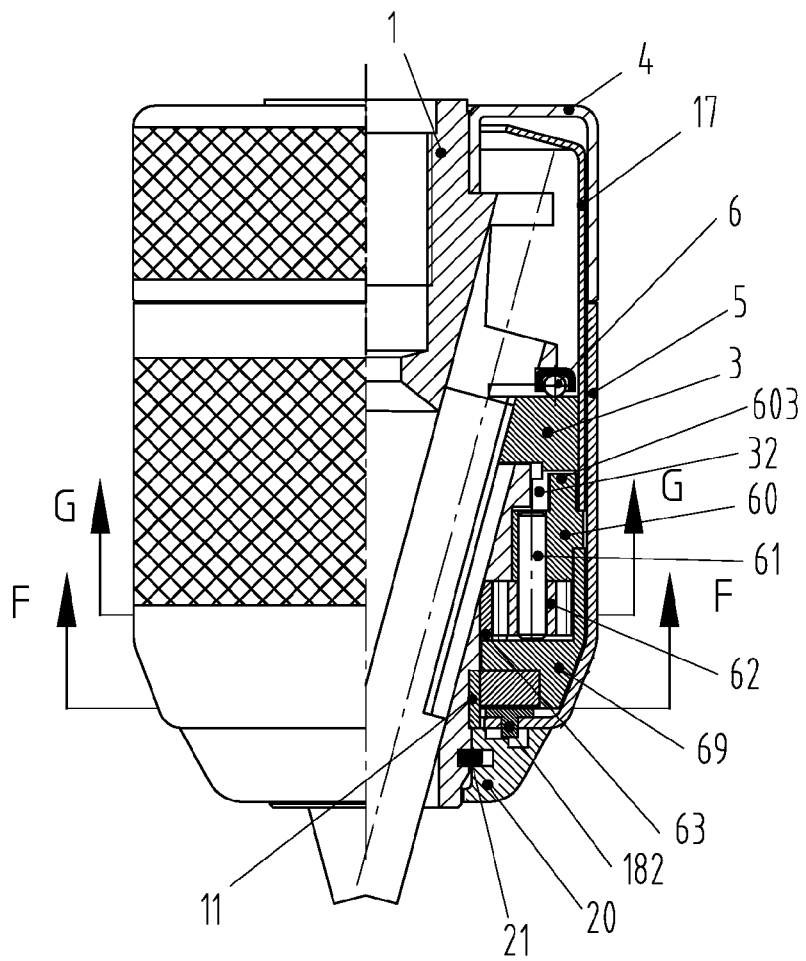

FIG. 41 to 50 show the fifth embodiment of the drill chuck locked through an inclined wedge surface according to the present invention which, on the basis of the first embodiment, provides additionally one planet gear transmission mechanism between the nut 3 and the wedge block type lock ring 9. Referring to FIG. 41, it can be understood that the planet gear mechanism comprises a planet gear 62, an inner teething ring 69, a teething ring 63, and a planet gear bracket 60, wherein the teething ring 63 is fixed on the drill body.

Figure 48:
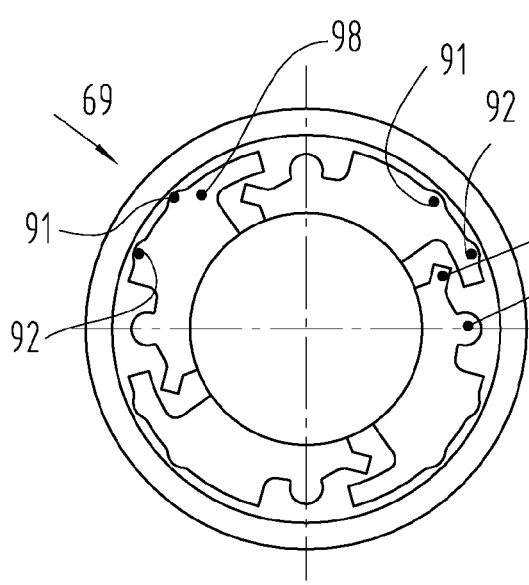
Figure 49:
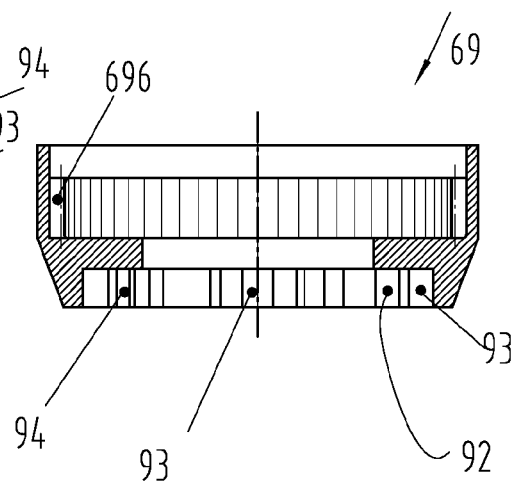
Figure 50:
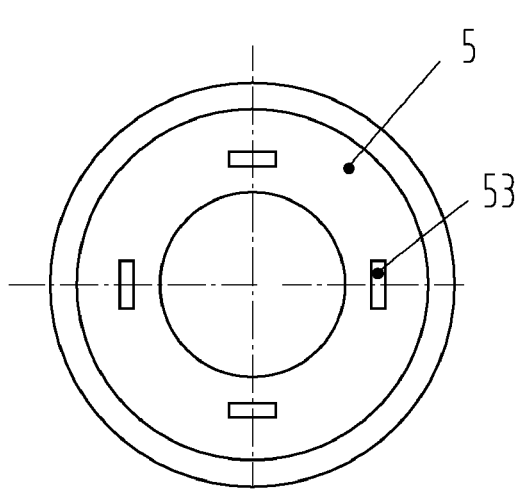

Referring to FIGS. 48 and 49, it can be found that the inner teething ring 69 is the one-piece member integrated by the gear teeth 696 and the wedge block type lock ring 9 and is provided thereon with the first and second drive positions 91 and 92, the drive grooves 98, the wedge block mounting positions 93, and the elastic mounting positions 94, of which the functions are the same as those mentioned in the first embodiment.

Figure 44:
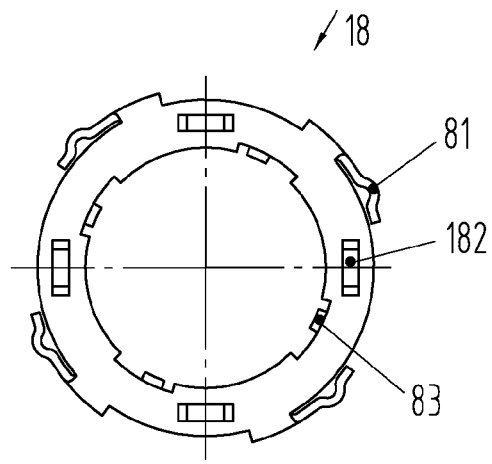
Figure 46:
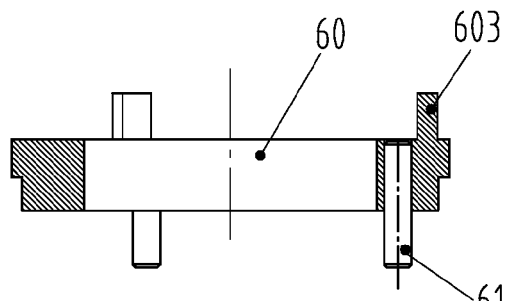
Figure 45:
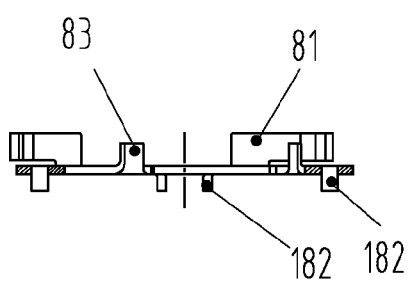
Figure 47:
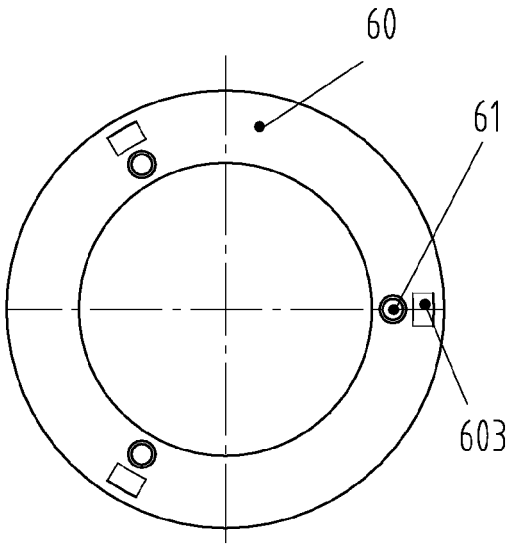

Referring to FIGS. 44 and 45, it can be found that the control member 18 is provided with the drive keys 182, the drive claws 81 and the poking claws 83 and is connected together with the outer sleeve 5 through the inserted connection and cooperation between the drive key 182 and the hole 53 with the drive claw 81 used for driving the inner teething ring 69. The rotation of the inner teething ring 69 drives the planet gear which, in turn, drives the planet gear bracket 60 to rotate. Referring to FIGS. 46 and 47, it can be found that the planet gear bracket 60 is provided on one end with plural keys 603 connected insertedly with the nut 3, i.e., the rotation of the planet gear bracket 60 drives the nut 3 to rotate.

Figure 42:
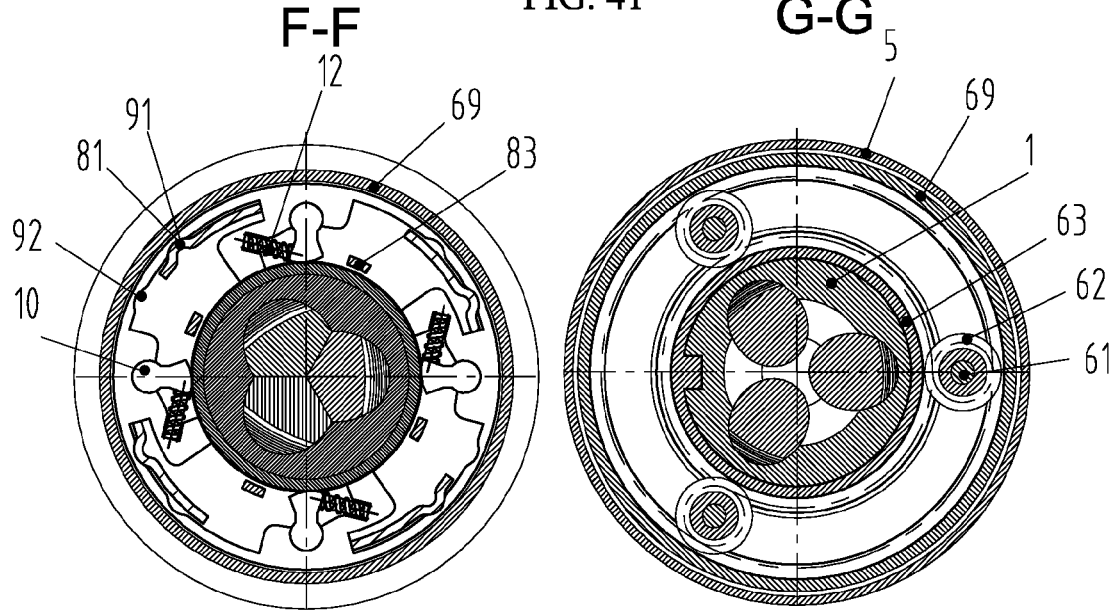
Figure 43:
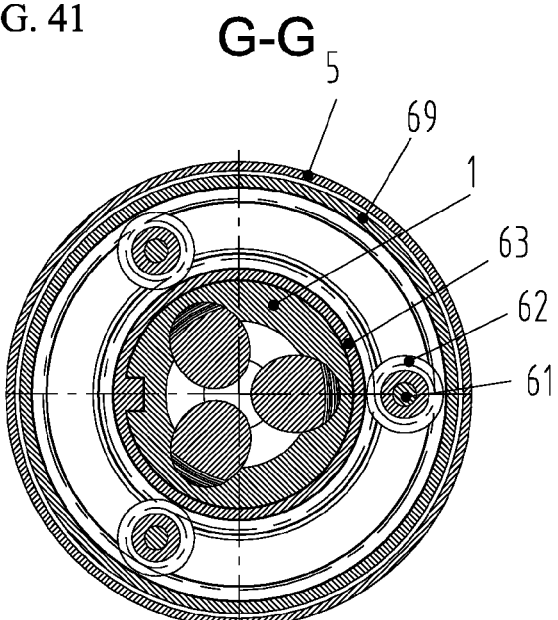

Due to the wedge block type lock ring structure provided on the inner teething ring 69, the inclined wedge surface of the wedge block 10 on the inner teething ring contacts with the locking surface of the drill body to be locked frictionally, as shown in FIG. 42. Additionally, there is a transmission relation of planet gear mechanism from the outer sleeve to the nut, therefore the nut can be provided with a magnified torque, as shown in FIG. 43.

Sixth Embodiment

Figure 52:
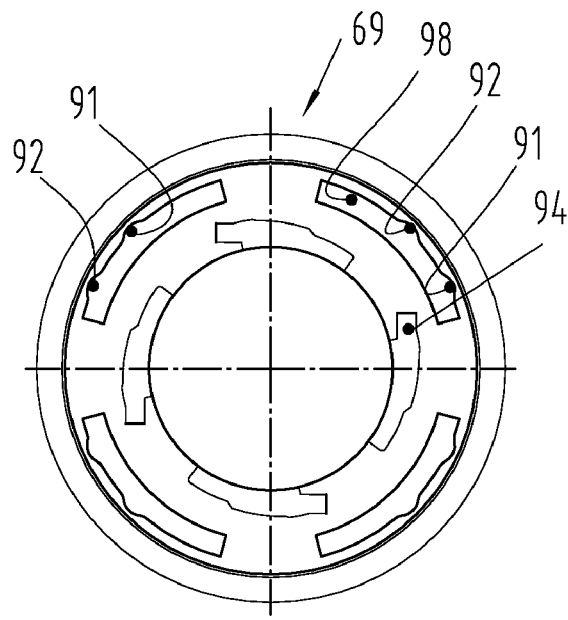
Figure 51:
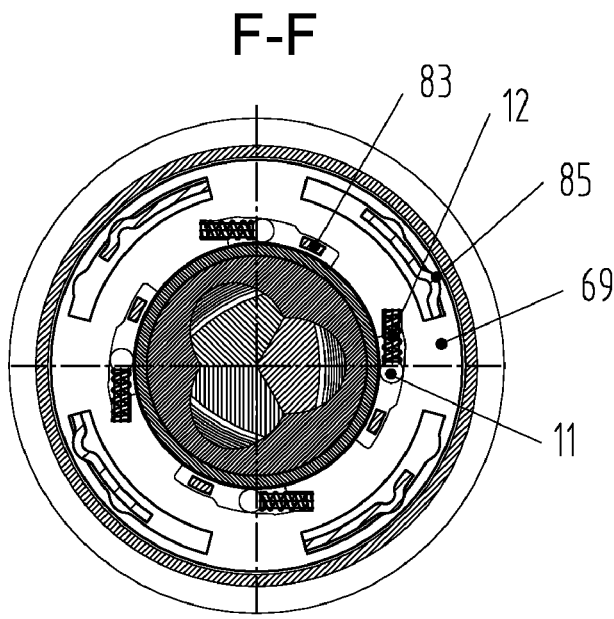
Figure 53:
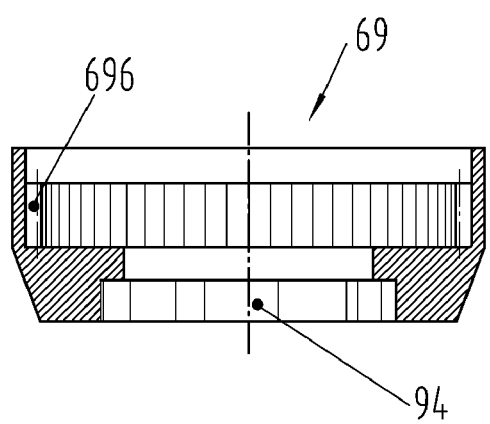
Figures 61, 62:
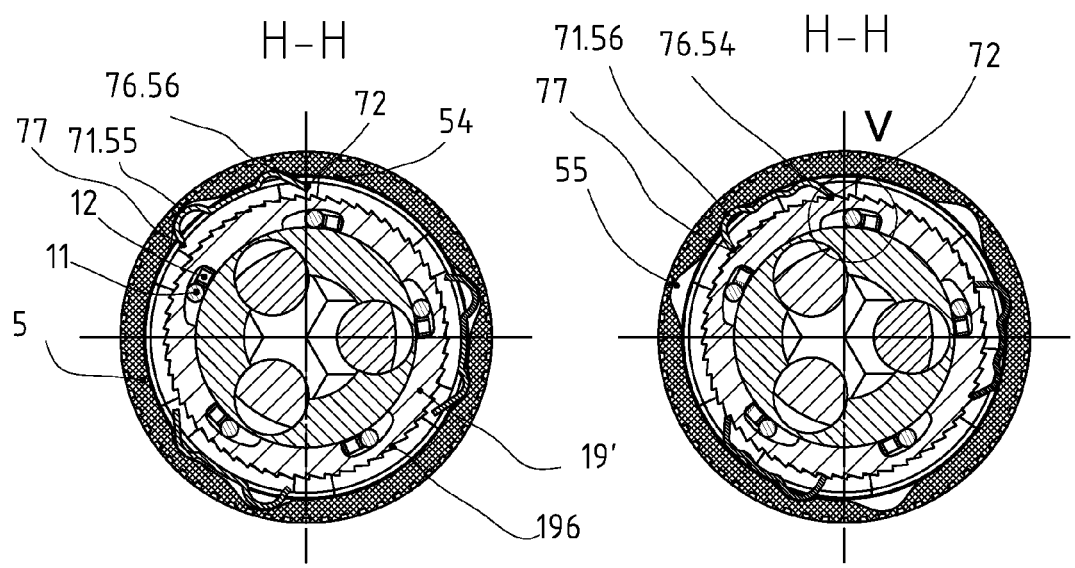
FIG. 61 is a top cross sectional view of a variant of the seventh embodiment of the drill chuck locked through an inclined wedge surface according to the present invention taken along the line H-H in FIG. 54, wherein the drill chuck is in a state of unlocking.
FIG. 62 is a top cross sectional view, wherein the drill chuck shown in FIG. 61 is in a state of locking.
Figure 63:
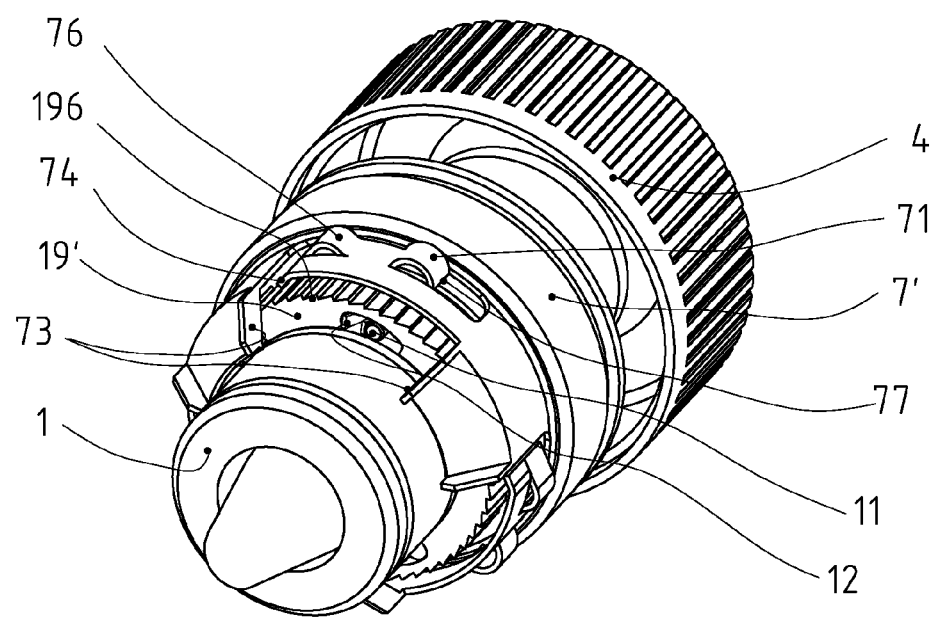
FIG. 63 is a perspective view of the drill chuck shown in FIG. 61, wherein the outer sleeve is removed.
Figure 64:
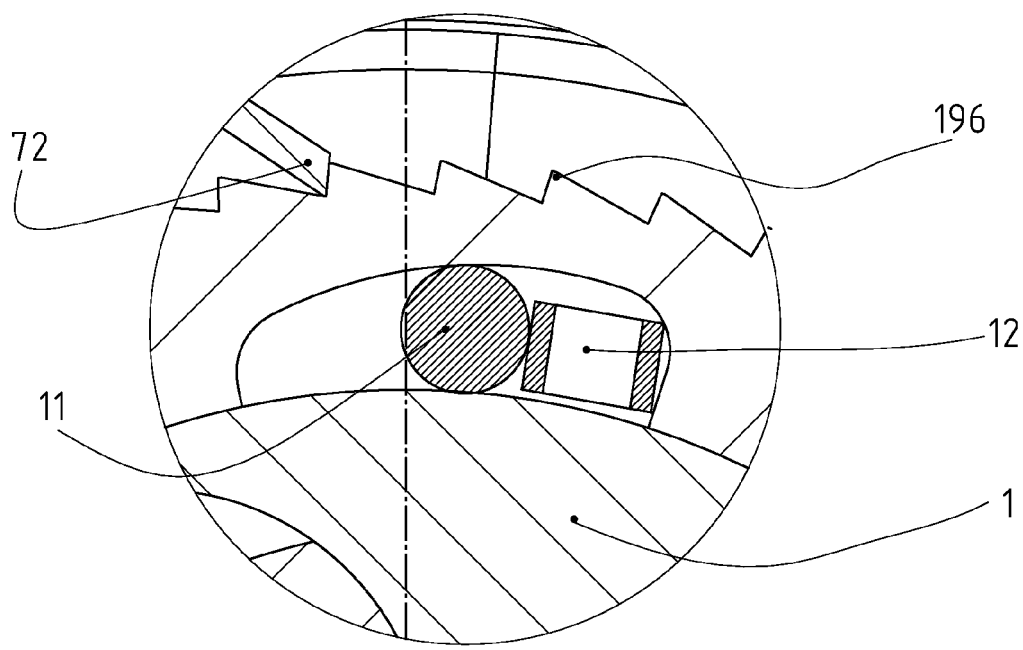
FIG. 64 is a partial enlargement view of the part V in FIG. 62, showing the structure and position relations between the lock ring of rolling body type, the rolling body and the elastic member.

FIG. 51 to 53 show the sixth embodiment of the drill chuck locked through an inclined wedge surface according to the present invention which, on the basis of the third embodiment, provides additionally one planet gear transmission mechanism between the nut and the rolling body type lock ring. The planet, gear mechanism comprises planet gears 62, an inner teething ring 69, a teething ring 63, and a planet gear bracket 60, wherein the teething ring 63 is fixed on the drill body and the inner teething ring 69 is a one-piece member integrated by the gear teeth 696 and the rolling body type lock ring, as shown in FIGS. 52 and 53, with their arrangement and functions as same as those in the fifth embodiment which are not described redundantly herein.

The planet gear transmission mechanisms in the fifth and sixth embodiments are provided in the front portion of the drill body, while it is apparent to those skilled in the art that it may be provided at the rear portion of the drill body as well, i.e., on the basis of the second and fourth embodiments.

Seventh Embodiment

FIG. 54 to 66 show the structures of the drill chuck locked through an inclined wedge surface and the variant thereof according to the seventh embodiment of the present invention.

The nut sleeve 7' comprises at the lower end connecting keys 73 which protrude downward to cooperate with the corresponding grooves (see FIG. 59) in the outer sleeve and has a movement range with respect to the groove.

Figures 65, 66:
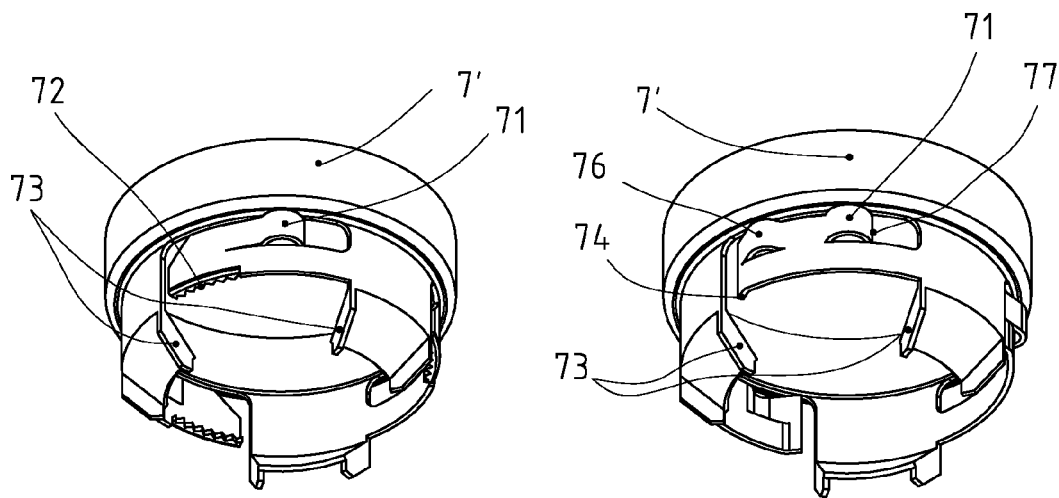
FIG. 65 is a perspective view of the nut sleeve in FIG. 54.
FIG. 66 is a perspective view of the nut sleeve in FIG. 61.
Figure 67:
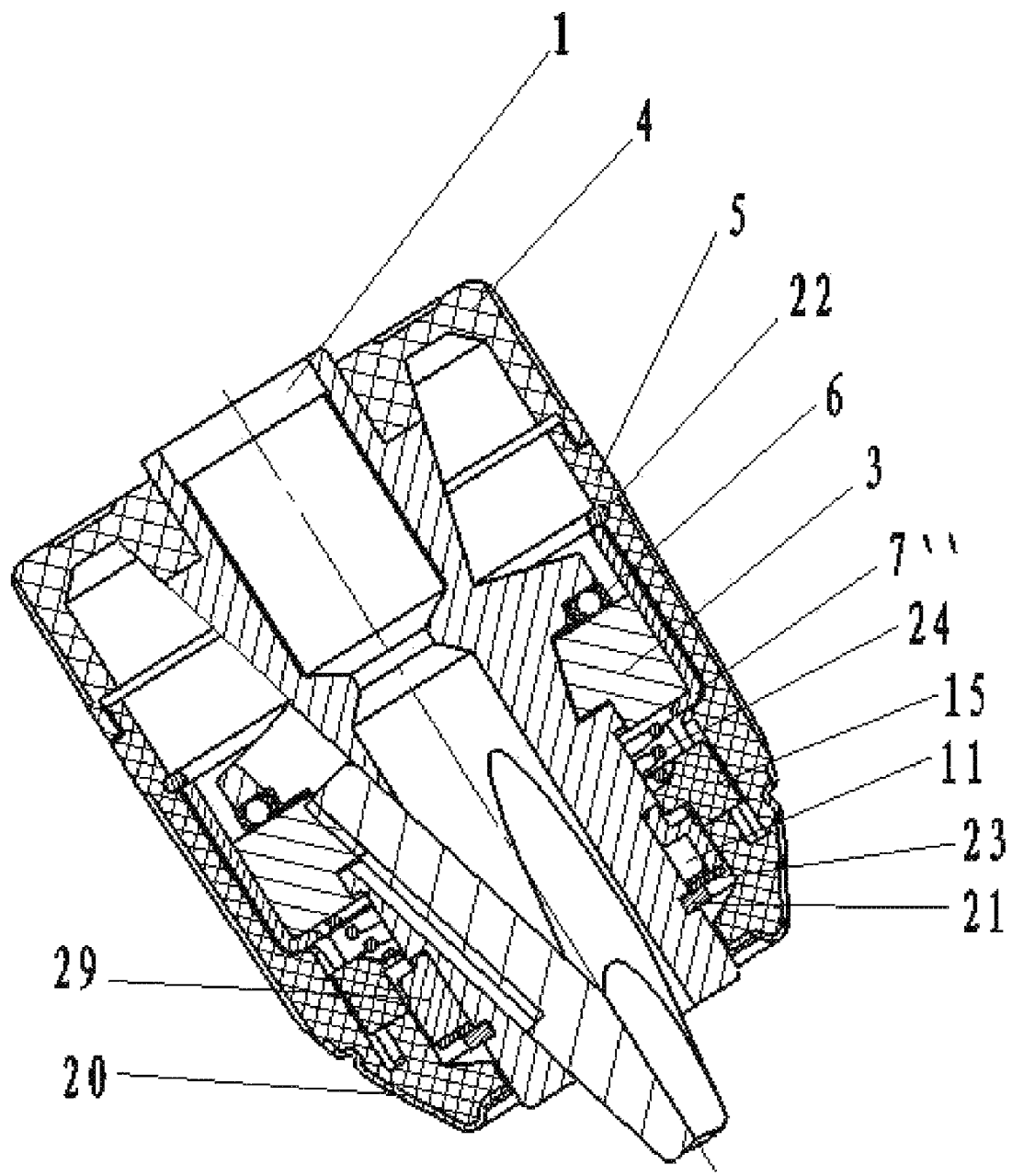
FIG. 67 is a perspective cross sectional view of the drill chuck of the eighth embodiment according to the present invention.
Figure 68:
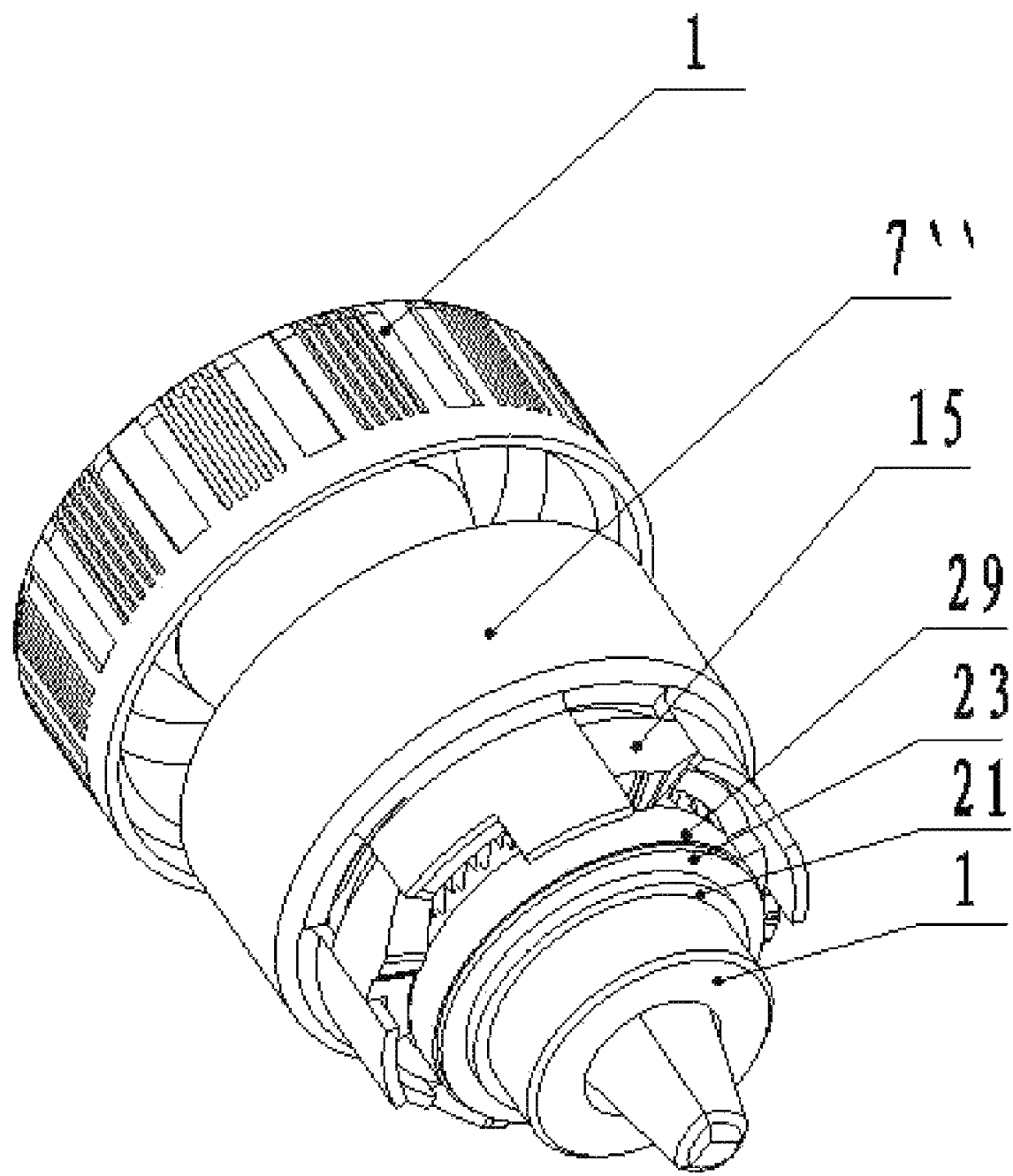
FIG. 68 is another perspective view of the drill chuck in FIG. 67, wherein the front cover and the outer sleeve are removed from the drill chuck.
Figure 69:
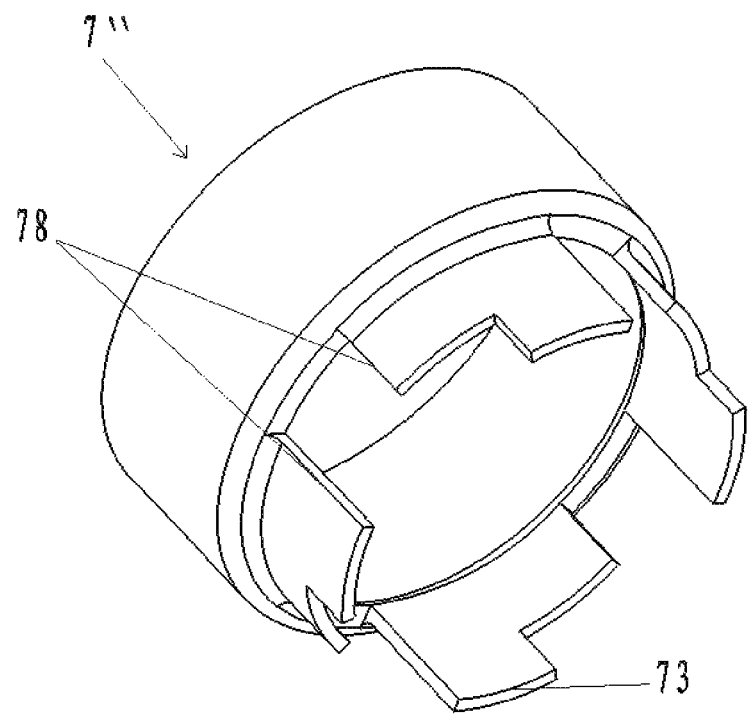
FIG. 69 is a perspective cross sectional view of the nut sleeve in FIG. 67.
Figure 70:
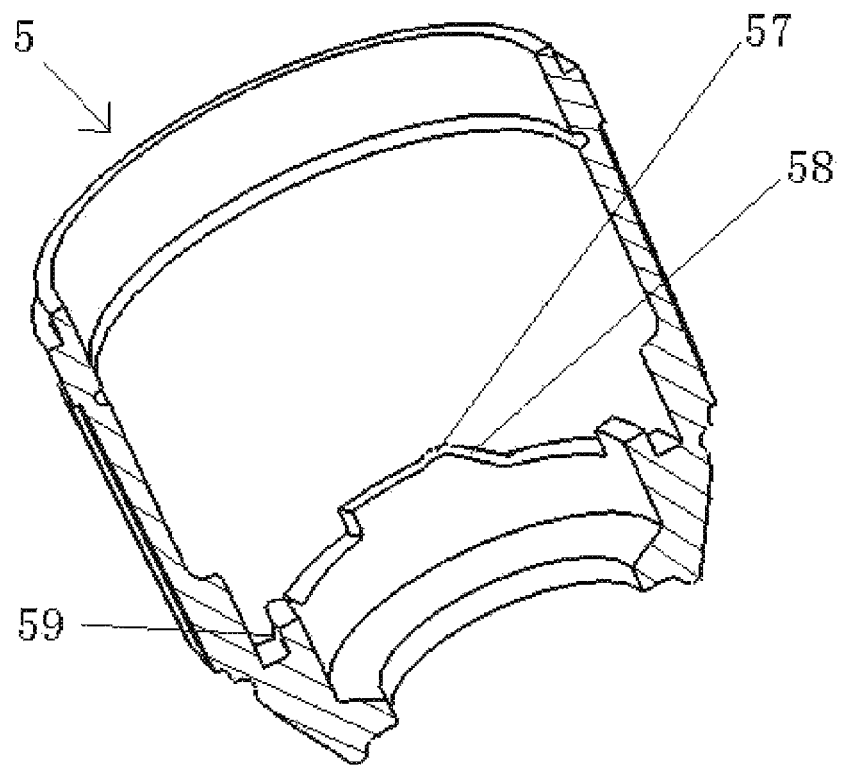
FIG. 70 is a perspective cross sectional view of the outer sleeve in FIG. 67.
Figure 71:
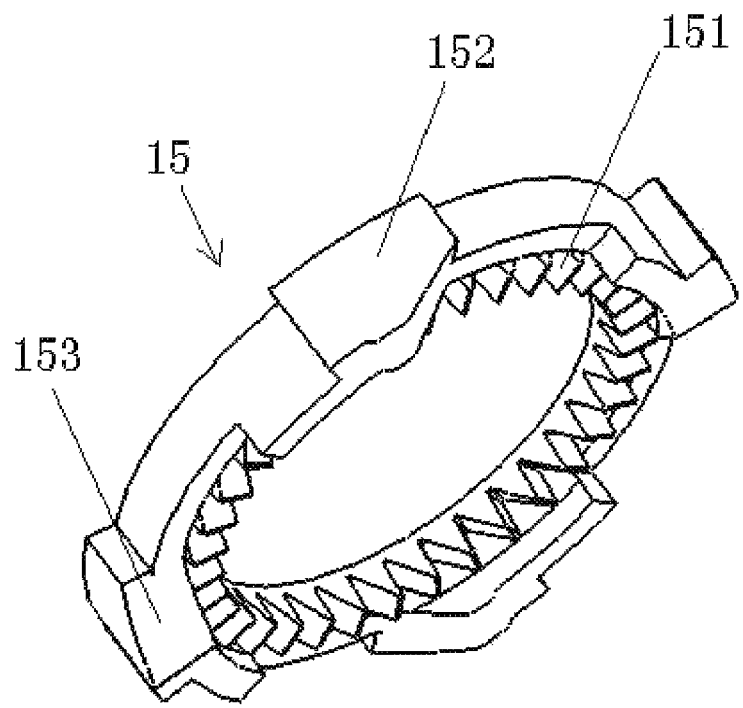
FIG. 71 is a perspective view of the clutch member in FIG. 67.
Figure 72:
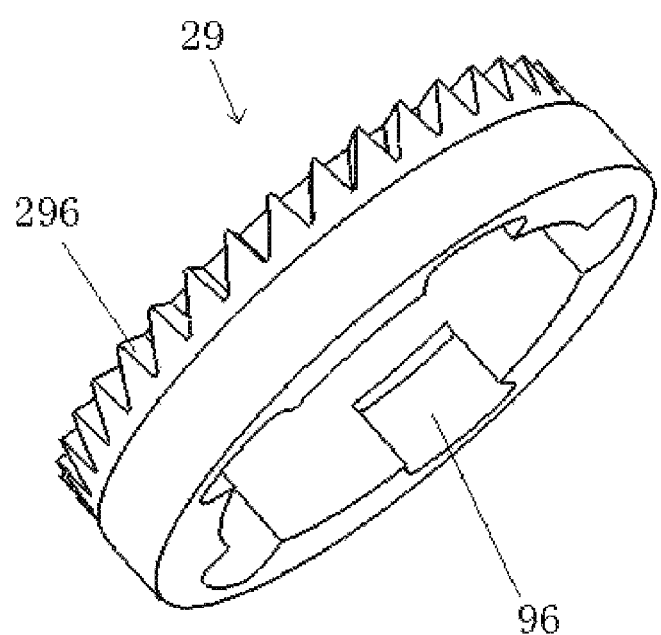
FIG. 72 is a perspective view of the lock ring of rolling body type in FIG. 67.

As shown in FIGS. 60 and 65, the nut sleeve 7' is provided at the lower portion with connecting portions extending elastically, and each of the connecting portions is connected at one end with the nut sleeve 7' as a one-piece structure, and the other end of the connecting portion is a free end. The connecting portion is provided on at least part of the inner surface with connecting teeth 72. In addition, a position projection 71 is also provided on the connecting portion as a one-piece structure. Correspondingly, the outer sleeve 5 is provided in the inner wall with relatively deep releasing position grooves 55 and relatively shallow locking position grooves 56. The elastic connecting portion can apply an elastic biasing force radically outward so that the position projection 71 abuts against the inner wall of the outer sleeve 5 and respectively cooperates with the releasing position groove 55 and the locking position groove 56 when the outer sleeve rotates in gripping and releasing directions.

A rolling body type lock ring 19' has a one way locking function, that is, when the rolling body type lock ring 19' is applied by a rotation torque, it only rotates (the lock ring 19' of rolling body type rotates, with respect to the rolling body 11 in an anticlockwise direction in FIG. 58) in a single direction; when the rolling body type lock ring 19' is applied by a rotation torque in a releasing direction with respect to the drill body, since the elastic member 12 forces the rolling body 11 to contact with the inclined wedge surface 96 and the locking surface 103 on the drill body all the time so as to be in a frictional locking state through the inclined wedge surface, the rolling body type lock ring 19' cannot rotate in a releasing direction with respect to the drill body.

During the gripping of the tool handle, first, the out sleeve rotates in the unlocking state, a position pawl 71 cooperates with the releasing position groove 55, the connecting teeth 196 of the rolling body type lock ring 19' is in a disconnected state with the connecting teeth 72 of the nut sleeve 7', and the outer sleeve directly drives nut to rotate and the nut drives the jaws to move; and the rolling body type lock ring 19' rotates together with the drill body under the effects of pressing force of the elastic members 12 and the friction of the rolling bodies 11.

When a certain gripping torque comes, the position pawl 71 enters the locking position groove 56 from the releasing position groove 55 and enters a locking state. The locking position groove of the outer sleeve 5 compresses the position pawl 71 such that the connecting teeth 72 on the nut sleeve is connected with the connecting teeth 196 on the rolling body type lock ring 19', thereby the nut sleeve 7' is connected with the rolling body type lock, ring 19' and there is no relative rotation therebetween. As the rolling body type lock ring 19' has the one way locking function, then after gripping, the rolling body type lock ring 19' and the nut 3 are locked, and the locking function is realized.

In case of releasing, the outer sleeve is rotated in a reverse direction, the compressing on the position pawl 71 is released, such that the connecting teeth 72 are disconnected with the connecting teeth 196, and then the nut sleeve 7 and the nut 3 can rotate reversely under the direct driving of the outer sleeve 5.

The elastic member 12 provided on the elastic member mounting position of the rolling body type lock ring can be a rubber stick, a elastic sheet, a spring and the like.

The rolling body 12 can be a roller, a rolling ball and the like.

In the present embodiment, the surface on the rolling body 11 which contacts with the drill body 1 belongs to an inclined wedge surface, and the surface on the lock ring 19' of rolling body type which contacts with the rolling body 11 also belongs to an inclined wedge surface. Optionally, the surface on the lock ring 19' of rolling body type which contacts with the rolling body 11 can also be an inclined plane.

Wherein FIGS. 54 and 55 are respectively a front cross sectional view and a top cross sectional view taken along the line H-H of the drill chuck locked through an inclined wedge surface in the seventh embodiment according to the present invention.

FIGS. 61-64 and 66 further show a variant structure of the drill chuck locked through an inclined wedge surface of the seventh embodiment, wherein the connecting portion 76 in a shape of pawl and the pawl tip 74 on the nut sleeve 7' replace, the connecting portion 76 and the connecting teeth 72 on the nut sleeve 7' in FIG. 54-60.

When the drill chuck enters a locking state, the inner wall 54 of the outer sleeve 5 and the locking position groove 56 respectively compress the connecting portion 76 and the position projection 71 such that the pawl points 74 and 77 engages with the connecting teeth 196, thereby the nut sleeve 7' and the rolling body type lock ring 19' are connected together, and they will not rotate with respect to each other even applied with a force.

Eighth Embodiment

FIG. 67 to 72 show the structure of the drill chuck locked through an inclined wedge surface according to the eighth embodiment of the present invention.

The differences between the present embodiment and the seventh embodiment are as follows:

the structure of the nut sleeve 7' of the seventh embodiment is separated functionally into a nut sleeve 7", a clutch member 15 and a spring 24 in the eighth embodiment, wherein the clutch member 15 can move axially along a guide slide track of the nut sleeve 7"; and the radical connecting teeth in the structure of the rolling body type lock ring 19 in the seventh embodiment is changed into the axial connecting teeth in the structure of the rolling body type lock ring 29 in the eighth embodiment.

The rotation process of the drill chuck according to the eighth embodiment is as follows:

In the unlocking state, when the outer sleeve 5 is rotated in the gripping direction, the cam camber 58 and the position portion 57 support the clutch member 15 such that the clutch member 15 and the rolling body type lock ring 29 are in a separated state, and at this point, the spring 24 is in a compressed state. When the outer sleeve 5 is rotated further, through the contact and engagement of its cam camber 58 and the position portion 57 with the earn camber 153 and the position portion 154 of the clutch member, the clutch member 15 brings the nut sleeve 7" and the nut 3 to rotate with the outer sleeve 5.

When the outer sleeve 5 is rotated such that the three jaws grip the tool handle and a relatively larger resistance moment happens, relative rotation between the outer sleeve 5 and the clutch member 15 appears, the drive groove 59 of the outer sleeve contacts at the side wall with the drive key 73 of the nut sleeve, and meanwhile, under the force of the spring, the clutch member 15 moves forward along the guide slide track 78 of the nut sleeve 7", causing the clutch teeth 151 of the clutch member 15 to engage with the connecting teeth 296 of the rolling body type lock ring 29. In this state, when the outer sleeve 5 is further rotated toward the gripping direction, the side wall of the drive groove 59 of the outer sleeve pushes the drive key 73 of the nut sleeve, causing the nut 3, the clutch member 15 and the rolling body type lock ring 29 to synchronously rotate with the nut sleeve 7" until the gripping is completed. The locking and anti-loosening function of the rolling body type lock ring 29 is the same as that of the rolling body type lock ring 19' in the seventh embodiment.

When the gripped drill handle is to be released, the outer sleeve 5 is rotated reversely, the other side wall of the drive groove 57 of the outer sleeve contacts with the drive key 73 of the nut sleeve, and the cam camber 58 of the outer sleeve slides with respect, to the clutch member 15 along the cam camber 153 of the clutch member 15, forcing the clutch member 15 to overcome the force of the spring and move backward along the guide slide track 78 of the nut sleeve 7" until the clutch teeth 151 completely disengage from the connecting teeth 296 of the rolling body type lock ring. As rolling body type lock ring 29 has disengaged from the clutch member 15, when the outer sleeve is further rotated, only the nut sleeve 7", the clutch member 15 and the nut 3 rotate synchronously with the outer sleeve toward the releasing direction, and the nut 3 drives the jaws backward to release the gripped drill handle.

Although four groups of poking claws, drive claws, wedge blocks and rolling bodies are shown in respective drawings, the amount of groups may be set to be other numbers such as two groups, three groups or more as long as the objects of the present invention can be achieved.

Described above are only the preferred embodiments of the present invention which do not limit the present invention. Rather, as for those skilled in the art, the present invention may have various changes and alternations. All such modifications, substitutions, improvements etc. within the spirit and principle of the present invention should be all covered in the scope of the affixed claims of the present invention.

What is claimed is:

1. A drill chuck locked through an inclined wedge surface, comprising:
    a drill body connected to a drive shaft of a power source at its rear end and having plural inclined holes arranged equally and circumferentially;
    plural jaws mounted in the plural corresponding inclined holes of the drill body respectively and having threads at its outer side surface;
    a nut fitted around the drill body and having threads at the inner surface so as to engage with the threads of the jaws; and
    an outer sleeve fitted around the drill body,
    a wedge block type lock ring fitted rotatably around the drill body and driving the nut to rotate, wherein a wedge block and an elastic member biasing the wedge block are pivotally connected therein and the wedge block has an inclined wedge surface locked frictionally with a locking surface of the drill body;
    a control sleeve connected with the outer sleeve and driving the wedge block type lock ring to rotate; and
    a poking claw, rotating synchronously with the control sleeve, between a first position where the poking claw is out of contact with the wedge block and a second positions where the poking claw is in contact with the wedge block; and
    wherein when the poking claw is in the first position, the inclined wedge surface closely contacts with the locking surface and when the poking claw is in the second position, the wedge block is dislocated and the inclined wedge surface comes out of contact with the locking surface.

2. The drill chuck locked through an inclined wedge surface according to claim 1, wherein the poking claw is provided on the control sleeve, the control sleeve is also provided with a drive claw, and the wedge block type lock ring is provided with a drive groove, wherein the drive claw cooperates with the drive groove to drive the wedge block type lock ring to rotate.

3. The drill chuck locked through an inclined wedge surface according to claim 1, further comprising a connecting sleeve and a poking claw member, wherein the connecting sleeve is connected at its first end to the nut and at its second end with the wedge block type lock ring; the poking claw is provided on the poking claw member, the poking claw member is connected with the control sleeve; and the control sleeve is provided with the drive claw which cooperates with the drive groove grooved on the wedge block type lock ring to drive the wedge block type lock ring to rotate.

4. The drill chuck locked through an inclined wedge surface according to claim 1, wherein the poking claw is provided on the control sleeve and the control sleeve is also provided with a drive claw which cooperates with the drive groove grooved on the wedge block type lock ring to drive the wedge block type lock ring to rotate; and a planet gear transmission device is also included comprising an inner teething ring, planet gears, a planet gear bracket and a teething ring with the planet gear bracket connected with the nut and the wedge block type lock ring driving the inner teething ring to rotate.

5. The drill chuck locked through an inclined wedge surface according to claim 4, wherein the inner teething ring and the wedge block type lock ring form a one-piece structure.

6. The drill chuck locked through an inclined wedge surface according to claim 5, wherein the drive groove of the wedge block type lock ring is provided with a first drive position and a second drive position, and the drive claw is provided with an elastic projection portion, wherein when the elastic projection portion is engaging with the first drive position, the poking claw is in the second position, and when the elastic projection portion is engaging with the second drive position, the poking claw is in the first position.

7. The drill chuck locked through an inclined wedge surface according to claim 6, wherein the inclined wedge surface of the wedge block is formed by an eccentricity camber with its circle center offsets from the pivoting center of the wedge block.

* * * * *

UNITED STATES PATENT AND TRADEMARK OFFICE
CERTIFICATE OF CORRECTION

PATENT NO. : 7,946,594 B2
APPLICATION NO. : 11/751992
DATED : May 24, 2011
INVENTOR(S) : Tan et al.

It is certified that error appears in the above-identified patent and that said Letters Patent is hereby corrected as shown below:

IN THE SPECIFICATION

Column 1, line 51     Now reads:    "-ping a fool handle"
                      Should read:  -- -ping a tool handle --

Column 1, line 65     Now reads:    "arranged equally and circumferentially,"
                      Should read:  -- arranged equally and circumferentially; --

Column 5, line 6      Now reads:    "taken along the sine B-B."
                      Should read:  -- taken along the line B-B. --

Column 5, line 13     Now reads:    "Fig. 16 is atop view"
                      Should read:  -- Fig. 16 is a top view --

Column 5, line 19     Now reads:    "Fig. 20 is atop view of"
                      Should read:  -- Fig. 20 is a top view of --

Column 5, line 21     Now reads:    "Fig. 21 is a tope view"
                      Should read:  -- Fig. 21 is a top view --

Column 9, line 11     Now reads:    "case of a lager elastic"
                      Should read:  -- case of a larger elastic --

Column 9, line 63     Now reads:    "lock ring 9, the lock; ring"
                      Should read:  -- lock ring 9, the lock ring --

Column 11, line 12    Now reads:    "an acute angel V"
                      Should read:  -- an acute angle V --

Signed and Sealed this
Eighteenth Day of February, 2014

Michelle K. Lee
*Deputy Director of the United States Patent and Trademark Office*

CERTIFICATE OF CORRECTION (continued)
U.S. Pat. No. 7,946,594 B2

| | | |
|---|---|---|
| Column 13, line 34 | Now reads: | "type lock, ring" |
| | Should read: | -- type lock ring -- |
| Column 13, line 65 | Now reads: | "sleeve 7' replace, the" |
| | Should read: | -- sleeve 7' replace the -- |
| Column 14, line 35 | Now reads: | "earn camber 153" |
| | Should read: | -- cam camber 153 -- |